United States Patent
Baysal et al.

(10) Patent No.: US 10,430,880 B2
(45) Date of Patent: Oct. 1, 2019

(54) MARGIN REQUIREMENT DETERMINATION AND MODELING FOR CLEARED CREDIT

(71) Applicant: Chicago Mercantile Exchange Inc., Chicago, IL (US)

(72) Inventors: Evren Baysal, Chicago, IL (US); Kailin Ding, Chicago, IL (US); Nick Li, Chicago, IL (US); Lu Lu, Pittsburgh, PA (US); Chao Wang, Chicago, IL (US); Panos Xythalis, Scotch Plains, NJ (US); Alice Yang, Chicago, IL (US); Jun Zhai, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 450 days.

(21) Appl. No.: 14/706,673

(22) Filed: May 7, 2015

(65) Prior Publication Data
US 2015/0332404 A1    Nov. 19, 2015

Related U.S. Application Data

(60) Provisional application No. 61/994,624, filed on May 16, 2014, provisional application No. 61/994,611, filed on May 16, 2014.

(51) Int. Cl.
*G06Q 40/06* (2012.01)
*G06Q 40/04* (2012.01)

(52) U.S. Cl.
CPC ............ *G06Q 40/04* (2013.01); *G06Q 40/06* (2013.01)

(58) Field of Classification Search
CPC ..................................................... G06Q 40/06
USPC ........................................................ 705/36 R
See application file for complete search history.

(56) References Cited

U.S. PATENT DOCUMENTS

| 8,805,735 | B1 | 8/2014 | Goldberg et al. | |
| 2003/0195830 | A1* | 10/2003 | Merkoulovitch | G06Q 10/0635 705/36 R |
| 2012/0130923 | A1* | 5/2012 | Shah | G06Q 40/00 705/36 R |

OTHER PUBLICATIONS

Arakelyan et al., Liquidity in Credit Default Swap Markets, Jan. 10, 2012, 40 pages.
Campbell, A Review of Backtesting and Backtesting Procedures, Finance and Economics Discussion Series Divisions of Research & Statistics and Monetary Affairs Federal Reserve Board, Washington, D.C., Apr. 20, 2015, 25 pages.
Junge et al., Liquidity Risk in Credit Default Swap Markets, Jun. 6, 2014, 86 pages.
Value-at-Risk: Theory and Practice, Backtesting Value-at-Risk With Coverage Tests, Aug. 27, 2014, 5 pages.
(Continued)

*Primary Examiner* — Robert R Niquette
*Assistant Examiner* — Liz P Nguyen
(74) *Attorney, Agent, or Firm* — Lempi Summerfield Katz LLC

(57) ABSTRACT

Systems and methods are provided for calculating margin requirements and stress testing exposures of cleared credit portfolios. These margin requirements are calculated using the following components: spread risk, idiosyncratic risk, interest rate, and liquidity risk. The calculation of these risk components is accomplished with a detailed statistical analysis of the risk factors underlying instruments, such as a credit default swap instrument.

17 Claims, 23 Drawing Sheets

(56) References Cited

OTHER PUBLICATIONS

Basel Committee on Banking Supervision, Consultative document, Sound practices for backtesting counterparty credit risk models, Apr. 2010, 17 pages.
Roy, Estimation of Portfolio Value at Risk using Copula, RBI Working Paper Series, Apr. 2011, 34 pages.
Lopez, An Academic Perspective on Backtesting and Stress-testing, Presentation for Credit Risk Models and the Future of Capital Management, Federal Reserve Bank of San Francisco, Aug. 28-29, 2000, 20 pages.
White, The Pricing and Risk Management of Credit Default Swaps, with a focus on the ISDA Model, OpenGamma Quantitative Research, Oct. 15, 2013, 50 pages.
Weistroffer, Credit default swaps, Heading towards a more stable system, Deutsche Bank Research, Dec. 21, 2009, 28 pages.
Ivanov et al., CDS Clearing at ICE: A Unique Methodology, Futures Industry, Jan. 5, 2012, 4 pages.
Review of CME Group's Credit Default Swap Margin Model and Financial Safeguards for CDS Clearing, RMCS Inc., Apr. 18, 2009, 32 pages.
Tang et al., Liquidity, Liquidity Spillover, and Credit Default Swap Spreads, Mar. 15, 2006, 35 pages.
SIFMA Central Clearing Counterparty (CCP) Matrix, Oct. 2013, 6 pages.
Trapp, Credit and Liquidity Risk in Bond and CDS Markets, retrieved from http://www.finance-innovation.org/risk08/files/6024018.pdf, Mar. 27, 2008, 38 pages.
Avellaneda, Central Clearing & Central Counterparties: A risk-manager's perspective, retrieved from https://www.math.nyu.edu/faculty/avellane/CCP_IMI.pdf, slides, Banca IMI May 2011, 43 pages.

\* cited by examiner

MARGIN REQUIREMENT DETERMINATION AND MODELING FOR CLEARED CREDIT

This application claims priority to Provisional Application, U.S. Ser. No. 61/994,624, filed May 16, 2014 and to Provisional Application, U.S. Ser. No. 61/994,611, filed May 16, 2014 which are both incorporated herein by reference in their entirety.

FIELD OF THE INVENTION

Aspects of the invention relate to determining risks and margin requirements. More particularly, aspects of the invention relate to determining costs associated with liquidity margin requirements using a risk model for cleared credit.

BACKGROUND

Exchanges are typically associated with clearing houses that are responsible for settling trading accounts, clearing trades, collecting and maintaining performance bond funds, regulating delivery and reporting trading data. Clearing is the procedure through which the clearing house becomes buyer to each seller of a contract, and seller to each buyer, and assumes responsibility for protecting buyers and sellers from financial loss by assuring performance on each contract. This is effected through the clearing process, whereby transactions are matched.

Clearing houses establish clearing level performance bonds (margins) for traded financial products and establishes minimum performance bond requirements for customers. A performance bond, also referred to as a margin, is the funds that may be required to deposited by a customer with his or her broker, by a broker with a clearing member or by a clearing member with the clearing house, for the purpose of insuring the broker or clearing house against loss on open contracts. The performance bond is not a part payment on a purchase and helps to ensure the financial integrity of brokers, clearing members and exchanges or other trading entities as a whole. A performance bond to clearing house refers to the minimum dollar deposit which is required by the clearing house from clearing members in accordance with their positions. Maintenance, or maintenance margin, refers to a sum, usually smaller than the initial performance bond, which must remain on deposit in the customer's account for any position at all times. In order to minimize risk to an exchange or other trading entity while minimizing the burden on members, it is desirable to approximate the requisite performance bond or margin requirement as closely as possible to the actual risk of the account at any given time.

Risks and margin requirements can be difficult to determine for illiquid and concentrated positions. Illiquid positions do not allow a clearing house to quickly liquidate positions, which makes it difficult to value risks. Concentrated positions can make it difficult for a clearing house or other entity to find a buyer or seller. Accordingly, there is a need in the art for systems and methods for determining risks and margin requirements for illiquid and concentrated positions.

SUMMARY OF THE INVENTION

Aspects of the invention overcomes at least some of the problems and limitations of the prior art by providing systems and methods for valuing risks and margin requirements for portfolios that are illiquid or have concentrated positions. In some cases a model may include one or more of the following components: spread risk requirement, idiosyncratic risk requirement, interest rate requirement, and liquidity risk requirement. The choice, calibration and calculation of these risk requirements may dwell on a detailed statistical analysis of the risk factors underlying financial instruments in a portfolio. The proposed risk model may use daily log changes in credit spreads as spread risk factors. For single names the spread changes may be calculated for the standard benchmark tenors at 1, 3, 5, 7, and 10 years. For indices, which are quoted at fixed maturities, fixed tenor spread changes are bootstrapped from synthetic run rank series at fixed tenors to align with the single names. The new model may not rely on decomposition of indices into their single name constituents.

In some embodiments of the invention the concentration based liquidity charge includes the sum of a concentration charge for market exposure and a concentration charge for the basis of the portfolio.

In other embodiments, the present invention can be partially or wholly implemented on a computer-readable medium, for example, by storing computer-executable instructions or modules, or by utilizing computer-readable data structures.

Of course, the methods and systems of the above-referenced embodiments may also include other additional elements, steps, computer-executable instructions, or computer-readable data structures. In this regard, other embodiments are disclosed and claimed herein as well.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present invention may take physical form in certain parts and steps, embodiments of which will be described in detail in the following description and illustrated in the accompanying drawings that form a part hereof, wherein.

DETAILED DESCRIPTION

Figure 1:
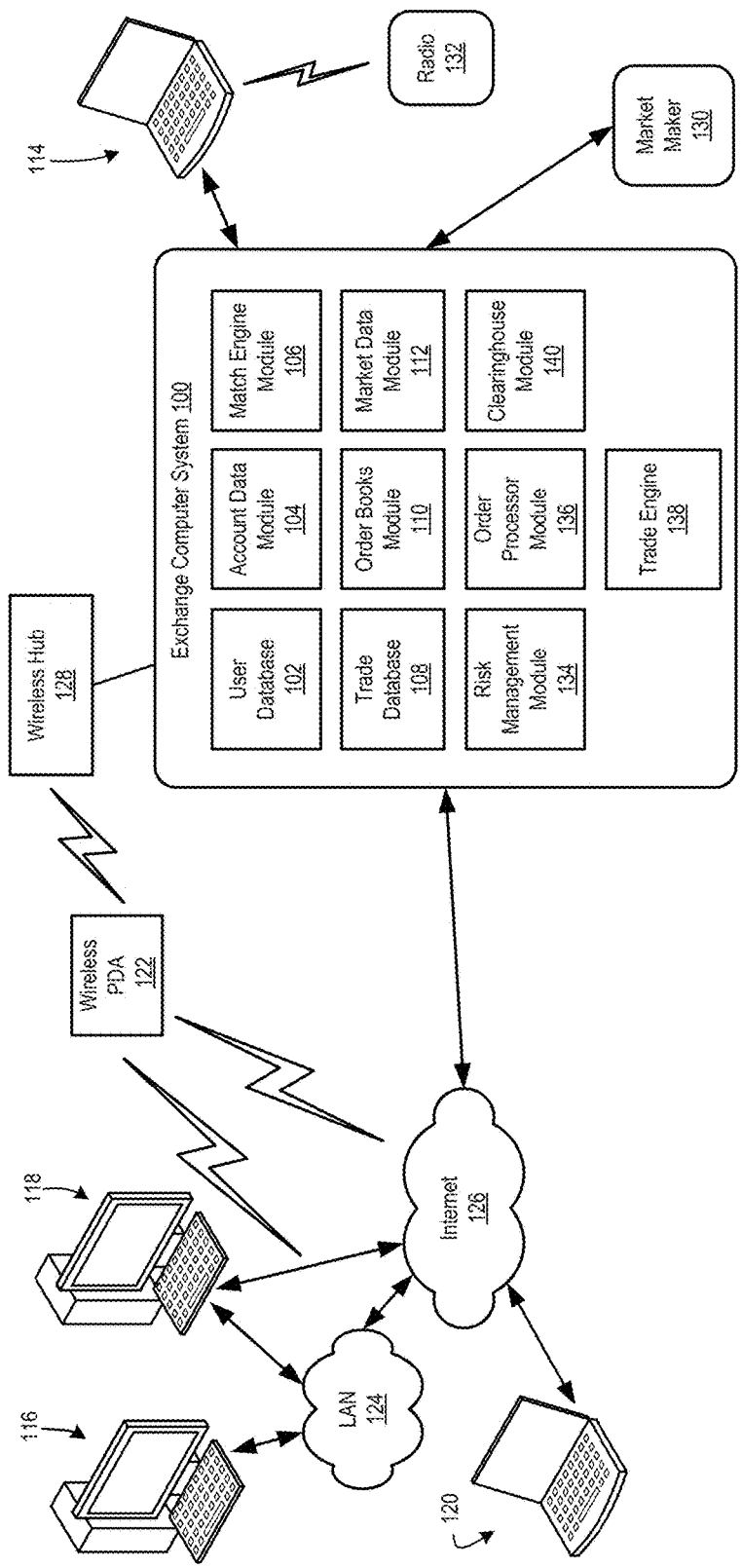
FIG. 1 shows an illustrative trading network environment for implementing trading systems and methods according to at least some embodiments.

In some cases, a risk model may be used for risk management pertaining to clearing of Credit Default Swap (CDS) and related instruments, including but not limited to NA CDX indices, NA single names, iTraxx indices, iTraxx single names, other credit indices, futures on indices, etc.

A clearing house may rely on one or more models to calculate margin requirements for its cleared credit portfolios. For example, the clearing house may provide clearing services for North American (NA) indices (IG and HY), foreign indices (e.g., Itraxx, etc.), NA single names, and/or foreign single names. As part of the clearing services, the clearinghouse may calculate margin requirements and/or stress test exposures to feed guarantee fund calculations. These calculations may rely on a risk management model that conforms to regulatory requirements and to the risk appetite of the clearing house. A risk model maybe desired to provide good coverage across a representative set of portfolios under a comprehensive set of historical and hypothetical scenarios, take into account all of the significant risk factors relevant to CDS instruments, consistently and proportionately model the effect of relevant risk factors on the total risk exposure of credit portfolios, and have robust, intuitive and justifiable parameterization that supports a reliable and transparent calibration and replication process.

Currently an illustrative clearing house may rely on models, such as a six factor model, to calculate margin requirements and may use a modified version of the model, to calculate stress requirements for its cleared credit portfolios. An illustrative current six-factor model may include systematic components, convergence/.divergence components, sector components, curve components, idiosyncratic components, and liquidity components. Often, however, a focus of the model may be on the margin model and/or the stress model without using liquidity. Further, the stress model may be modified to use a subset of the components of the margin model, such as a maximum four of the first five components listed for the margin model with or without liquidity. By using separate models, the calibration of the components may be different for margin and stress calculations. Further, the model may not handle indices directly, but may rely on decomposition of the indices into their single name constituents for profit and loss (P&L) calculations under shock scenarios.

However, the current risk models may not lead to an optimal and/or efficient assessment of credit portfolio risk. Further, these current risk models may have gross notional based charges (curve component) that are agnostic to portfolio risk characteristics. As a result, the calibration process may result in double counting of risk and may not appropriately take into account the effect of margin period of risk. This model parameterization, together with improper calibration, may lead to very static margins that are not reactive to changing market conditions. Further, the current model may have serious scalability issues due to lack of explicit correlation modeling. Furthermore, the inconsistencies in stress and margin calculations may lead to unintuitive changes in portfolio risk as a result of changes in the portfolio decomposition.

In some cases, an illustrative risk model for cleared credit (RMCC) may be used to overcome the above-noted deficiencies of many currently used models. The RMCC may be based on and/or supported by salient characteristics of risk factors affecting credit portfolios. The RMCC may be efficient in modeling risk of a portfolio of credit derivatives. For example, the RMCC may account for effects of hedging, diversification and concentration. Further, the risk model for cleared credit may be reactive to current market conditions and may be persistent to extreme events. The RMCC may be configured to be consistent with one or more risk policies, such as a margin period of risk. In some cases, the RMCC may be further configured to include specified add-ons for out of model conditions.

By using a risk modeling system, the clearinghouse may use an RMCC to provide a simple and/or intuitive model that may produce results that are easy to replicate by end users due to intuitive and/or straightforward parameterization. Further, this RMCC may be applicable to a broad range of instruments, such as CDX NA Indices for high yield (HY) and investment grade (IG) products, iTraxx (e.g., European, Asian, etc.) indices other credit indices, and to North American single names and/or foreign single names. The RMCC may include a clear calibration process that may be used to provide stability of the model parameters over time and/or to justify all model parameters based, at least in part, on empirical data. This risk model may be flexible enough to offer cross asset offsets and may be suitable for offering portfolio margining with correlated instruments. In some cases, the risk model may include counter-cyclical parameters, such as those used in counter cyclical volatility and correlation modeling (e.g., a long-run historical volatility floor, a systemic correlation scenario, a basis correlation scenario, etc.). Further, the risk model may be readily extendible to stress calculations.

Aspects of the present invention are implemented with computer devices and computer networks that allow users to exchange trading information. An exemplary trading network environment for implementing trading systems and methods is shown in FIG. 1. An exchange computer system 100 receives orders and transmits market data related to orders and trades to users. Exchange computer system 100 may be implemented with one or more mainframe, desktop or other computers. A user database 102 includes information identifying traders and other users of exchange computer system 100. Data may include user names and passwords. An account data module 104 may process account information that may be used during trades. A match engine module 106 is included to match bid and offer prices. Match engine module 106 may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose delta based and bulk order types for processing by order book module 110 and match engine module 106.

The trading network environment shown in FIG. 1 includes computer devices 114, 116, 118, 120 and 122. Each computer device includes a central processor that controls the overall operation of the computer and a system bus that connects the central processor to one or more conventional components, such as a network card or modem. Each computer device may also include a variety of interface units and drives for reading and writing data or files. Depending on the type of computer device, a user can interact with the computer with a keyboard, pointing device, microphone, pen device or other input device.

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet.

One or more market makers 130 may maintain a market by providing constant bid and offer prices for a derivative or security to exchange computer system 100. Exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on computer-readable medium. For example, computer device 116 may include computer-executable instructions for receiving order information from a user and transmitting that order information to exchange computer system 100. In another example, computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Illustrative Embodiments

In some cases, a risk model for cleared credit (RMCC) may be processed by a clearinghouse computer system using a combination of different factors. For example, the clearinghouse computer system may process the RMCC using a spread risk module to process a spread risk component, an idiosyncratic risk module to process an idiosyncratic risk component, an interest rate module to process an interest rate risk component and a liquidity risk module to process a liquidity risk component. These components may be chosen, calibrated and calculated based on a statistical analysis of the risk factors underlying CDS instruments.

Liquidity Risk Requirement and Model

In some cases, a risk model may be used for risk management pertaining to clearing of Credit Default Swap (CDS) and related credit instruments, including but not limited to NA CDX indices, NA single names, iTraxx indices, iTraxx single names, other credit indices, futures on indices, etc.

Sources of risks arising from clearing credit default swaps may include the cost of liquidating the CDS portfolio of a clearing member firm in case of default. Efficient modeling and estimation of this cost may be as important as quantifying the market risk related costs, if not more, for credit instruments as these instruments do have varying degrees of liquidity characteristics. A clearing house may offer clearing services for different indices, such as NA indices (IG and HY) and is planning to extend its offering to iTraxx indices (Main, Cross Over), and North American and European single names. The calculation of liquidity risk requirements as part of margin and stress exposures may be important to the success of a risk management model that conforms to regulatory requirements and to the risk appetite of the Clearing House. The liquidity risk model may, therefore, be used to provide good coverage across a representative set of portfolios under a comprehensive set of historical and hypothetical scenarios representing distressed liquidity, to take into account liquidity characteristics of credit instruments based on contract tenors, index families and series, and reference entities. In some cases, the liquidity risk model may also be used to consistently and proportionately model the effect of concentration (position size), to have a robust, intuitive and justifiable parameterization that supports a reliable and transparent calibration and replication process, and to be consistent with a default management process.

In some cases, a liquidity model used by an illustrative clearing house may address liquidity risk of portfolios consisting of only NA indices (IG and HY). In some cases, the current liquidity requirement may include two components which are intended to cover the costs associated with the steps of a typical liquidation process. The first component may be designed to cover the cost of hedging the market exposure of a defaulted portfolio while the second component may address the cost of liquidating the hedged portfolio. A progressive concentration charge may implicitly embed into the liquidity requirement through a super-linear dependence on position size. The Bid/Ask data across different series and tenors of index instruments may be incorporated in the model through a liquidity floor which is intended to address the liquidity risk of smaller size portfolios, which may be transacted at observed Bid/Ask spreads in case of default.

A previously used risk model may not differentiate between on-the-run and off-the-run indices and/or contracts of different tenors as long as they have similar market risk exposures measured by their SDV01 (spread adjusted DV01 ). The model therefore may not address the drop in liquidity of index series when they become off-the-run and the relative illiquidity of contracts on non 5-year tenors. This characteristic of the model makes it harder to extend to single names and other index instruments without making significant adjustments.

Figure 2:
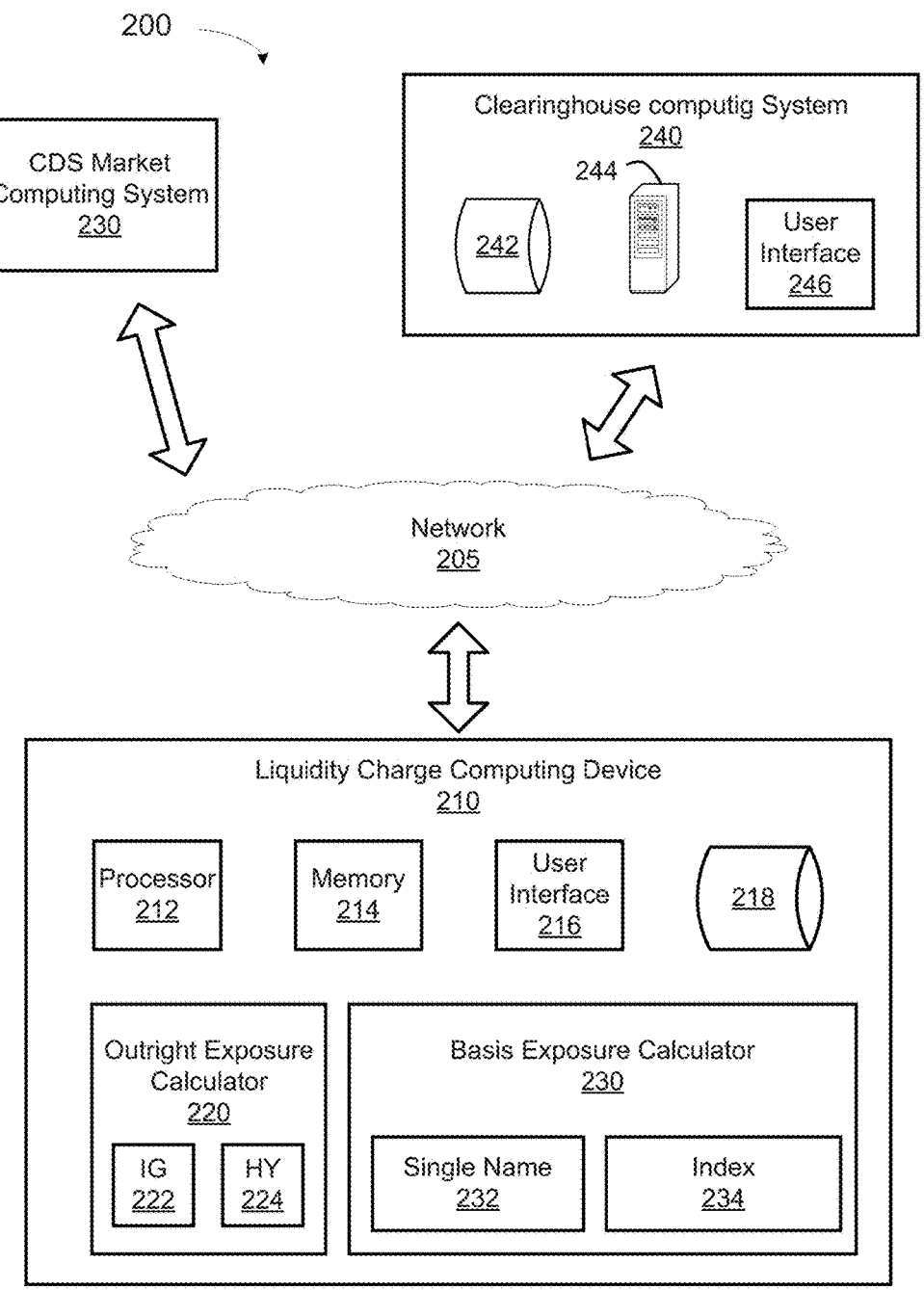
FIG. 2 shows an illustrative liquidity charge computing device that may be used to implement a liquidity model for cleared credit according to at least some embodiments.

FIG. 2 shows an illustrative block diagram representation of a liquidity charge computing system 200 for implementing a model for determining a liquidity charge associated with a credit default swap (CDS) portfolio. In some cases, the liquidity charge computing system may include a liquidity charge computing device 200 communicatively coupled via a network 205 (e.g., a wide area network (WAN), the LAN 124, the Internet 126, etc.) to a CDS market computing system 210. The CDS market computing system may include one or more computing devices configured for receiving and disseminating information corresponding to a CDS market, such as pricing information (e.g., bid information, ask information, etc.), CDS quality information (e.g., investment grade information, high yield information, etc.), tenor information, and/or the like. The liquidity charge computing device 210 may be communicatively coupled to a clearinghouse computing system 240 via the network 205, or otherwise incorporated into the clearinghouse computing system 240.

In some cases, the clearinghouse computing system 240 may include a data repository 242, one or more computing devices 244 and/or a user interface 246. The data repository may store instructions, that when executed by the one or more computing devices 244, may cause the one or more computing devices 244 to perform operations associated with determining performance bond contributions associated with holdings in products that are based on various types of credit default swaps. In some cases, the clearinghouse computing system 240 may present performance bond and/or margining information to a financial institution via the network 205, wherein the financial institution holds one or more portfolios that include a credit default swap. Further, the clearinghouse computing system 240 may further present the performance bond and/or margining information via one or more user interface screens via the user interface 246. The user interface 246 may be local to the clearinghouse computing system 240 and/or remote from the clearinghouse computing system 240 and accessible via the network 205. The user interface screens may graphically and/or textually present information corresponding to a margin requirement determined for a CDS portfolio as determined by the liquidity charge computing device 210.

The liquidity charge computing device 210 may include a processor 212, one or more non-transitory memory devices 214 (e.g., RAM, ROM, a disk drive, a flash drive, a redundant array of independent disks (RAID) server, and/or other such device etc.), a user interface 216, a data repository 218, a communication interface to facilitate communications via the network 205, and/or the like. The liquidity charge computing device 210 may be configured to store instructions in the one or more memory devices 214 and/or the data repository 218 that, when executed by the processor 212, may configure the liquidity charge computing device 210 to execute a model for determining margining requirements associated with a CDS portfolio. In some cases, the liquidity charge computing device 210 may process the instructions stored in the memory device 214 and/or the data repository 218 to calculate the margining requirements using an outright exposure calculator 220 and/or a basis exposure calculator 230. In some cases, the outright exposure calculator 220 may be used to calculate an outright exposure to liquidity charges for holdings held in a CDS portfolio. For example, the outright exposure calculator 220 may calculate an exposure associated with hedging an investment grade (IG) sub-portfolio held in the CDS portfolio using an IG exposure calculator 222. Similarly, the outright exposure calculator 220 may calculate an exposure associated with hedging a high yield (HY) sub-portfolio held in the CDS portfolio using a HY exposure calculator 224. The basis exposure calculator 230 may be used to calculate a cost of unwinding hedged positions held in the CDS portfolio. For example, the basis exposure calculator 230 may process instructions to calculate a cost of unwinding hedged single name positions held in the CDS portfolio using a single name basis exposure calculator 232. Similarly, the basis exposure calculator 230 may process instructions to calculate a cost of unwinding hedged index positions held in the CDS portfolio using an index basis exposure calculator 234.

The liquidity charge computing device 210 may process instructions corresponding to model to determine a liquidity charge and/or margin requirement associated with any particular CDS swap portfolio. This model may be stored as instructions in the one or more non-transitory memory devices 214 and/or the data repository 218 that, when executed by the processor 212 may cause the liquidity charge computing device to calculate the liquidity charge by calculating up to four different terms that may be added to yield an aggregate liquidity charge for portfolios consisting of indices (IG, HY) and single names, such as a cost of SDV01 hedge for IG sub-portfolio, a cost of SDV01 hedge for HY sub-portfolio, a cost of unwinding hedged index positions, and a cost of unwinding hedged single name positions. In some cases, the indexes and/or single name positions may be associated with a North American CDS market and/or a foreign CDS market (e.g., a European CDS market, an Asian CDS market, etc.). In some cases, a single name CDS may be based on a swap associated with a particular single name (e.g., corporation). An index may include a plurality of single name positions. As such, an index based CDS may be similar to a futures contract and may be based on a value of an index at a given time.

The liquidity charge computing device 210 may calculate a cost associated with liquidating the CDS positions held in a particular CDS portfolio. This liquidity charge may be used when determining margin requirements for the accounts holding one or more CDS portfolios. The liquidity charge may be calculated by the outright exposure calculator 220 and the basis exposure calculator of the liquidity charge computing device 210 using the formula:

Liquidity Charge=Outright exposure+Index Basis
    Exposure+Single Name Basis Exposure     (1)

where,

IG Outright Exposure = (2)

$$\alpha_{IG}|SDV01_{IG}|\max\left\{\left|\frac{SDV01_{IG}/SDV01_{OTR,IG,5Y}}{w(5Y)\gamma Q_{0,OTR,IG,5Y}}\right|^{1.5}, 1\right\}$$

where $SDV01_{IG} = \sum_{\substack{i \in IG, IN \text{ and } SN \\ \tau \in (1,3,5,7,10)}} SDV01_i$ (3)

HY Outright Exposure = (4)

$$\alpha_{HY}|SDV01_{HY}|\max\left\{\left|\frac{SDV01_{HY}/SDV01_{OTR,HY,5Y}}{w(5Y)\gamma Q_{0,OTR,HY,5Y}}\right|^{1.5}, 1\right\},$$

where $SDV01_{HY} = \sum_{\substack{i \in HY, IN \text{ and } SN \\ \tau \in (1,3,5,7,10)}} SDV01_i$ (5)

Index Basis Exposure = (6)

$$\beta_{IN} \sum_{\substack{i \in IN, \tau \in (1,3,5,7,10) \\ -IG\ OTR\ 5Y \\ -HY\ OTR\ 5Y}} f(\tau)|SDV01_{i\tau}|\max\{|Q_i/w(\tau)\gamma Q_{0i}|^{0.5}, 1\}$$

Single Name Basis Exposure = (7)

$$\beta_{SN} \sum_{\substack{i \in SN, \\ \tau \in (1,3,5,7,10)}} f(\tau)|SDV01_{i\tau}|\max\{|Q_i/w(\tau)\gamma Q_{0i}|^{0.5}, 1\}$$

Here, $Q_{0i}$ is a median weekly trading volume and may be calibrated to most recent 13 weeks for the entity (e.g., single name) and aggregated across different tenors. $Q_{0i}$ is a median weekly trading volume and may be calibrated to most recent 13 weeks for the entity (e.g., single name) and aggregated across different tenors. The function $f(\tau)$ is a tenor scalar for calculating the liquidity charge and may be based on a ratio of Bid-Ask/Mid prices across different tenors. The function $w(\tau)$ is a tenor adjustor for weekly trading volume and may be a function of $f(\tau)$. The constant $\gamma$ is associated with a proportion of weekly trading volume that can be liquidated per day. This constant may be set to any value and may be set to a same value for the different sub portfolios (e.g., HY, IG) and/or for index basis exposure and/or single name basis exposure. For example, $\gamma$ may be set to a particular constant value for each equation (2), (4), (6), and (7) (e.g., about 10%, about 15%, about 5%, etc.). In some cases, $\gamma$ may be set to different values when determining the IG or HY outright exposure, the Index basis exposure, and/or the single name basis exposure.

In an illustrative example, the cost of an SDV01 hedge for an IG sub-portfolio may represent the cost of hedging the aggregate SDV01 exposure of IG indices and IG single names. This cost may be measured as a function of the IG on-the-run notional required for hedging the total SDV01 exposure of the IG sub-portfolio. The charge scales super linearly when the hedge notional may become relatively large compared to a proportion (e.g., about 10%) of the median weekly trading volume of on-the-run IG 5-year contract. The trading volume on the 5-year contract may be estimated by applying a tenor adjustor on the total trading volume of the on-the-run IG contracts. The tenor adjustor may be calibrated to Bid/Ask and Mid spread data on indices.

The cost of an SDV01 hedge for an HY sub-portfolio may represent the cost of hedging the aggregate SDV01 exposure of HY indices and HY single names. This cost may be measured as a function of the HY on-the-run notional required for hedging the total SDV01 exposure of the HY sub-portfolio. The charge may scale super linearly when the hedge notional becomes relatively large compared to a proportion (e.g., about 10%) of the median weekly trading volume of on-the-run HY 5-year contract. The trading volume on the 5-year contract may be estimated by applying a tenor adjustor on the total trading volume of the on-the-run HY contracts. The tenor adjustor may be calibrated to Bid/Ask and Mid spread data on indices.

A cost of unwinding hedged index positions may represent the cost of liquidating hedged index positions. This cost may be measured as a function of the SDV01 of each off-the-run or non-5 year index series position. The charge may scale super linearly when the position notional becomes relatively large compared to a proportion (e.g., about 10%) of the median weekly trading volume of the index series and tenor combination. The trading volume of the index series and tenor may be estimated by applying a tenor adjustor on the total trading volume of the index series. The tenor adjustor may be calibrated to Bid/Ask and Mid spread data on indices.

A cost of unwinding hedged single name positions may represent the cost of liquidating single name positions of the CDS portfolio hedged by corresponding index positions. This cost may be measured as a function of the SDV01 of each single name position. The charge may scale super linearly when the position notional becomes relatively large compared to a proportion (e.g., about 10%) of the median weekly trading volume of the reference entity and tenor combination. The trading volume of the reference entity and tenor may be estimated by applying a tenor adjustor on the total trading volume of the reference entity. The tenor adjustor may be calibrated to Bid/Ask and Mid spread data on single names.

The liquidity model may include a number of risk aversion parameters, (e.g., four risk aversion parameters as illustrated) which may be associated with different terms in the liquidity formula. These risk aversion parameters may be calibrated and/or back-tested to dealer polls on liquidity. For example, the risk aversion parameters may be calibrated to account for pure index CDS portfolios and/or for single name CDS portfolios. The single name CDS portfolios may include index positions to cover index-single name arbitrage portfolios, and/or the like.

While the model illustrated in equations (1)-(7) may be configured to cover liquidity exposure (e.g., risk) associated with North American (e.g., NA) CDS markets, the model can easily be extended to cover a liquidity risk of portfolios that may contain other indices (e.g., a European CDS index, an Asian CDS index, etc.) such as iTraxx. The extension of the model to cover other product families may be achieved simply by adding terms for hedging and unwinding such positions (after hedging). Calibration of the risk aversion parameters for these terms may be done using dealer polls on portfolios containing such instruments.

The model for liquidity charge for CDS portfolios, as executed by the outright exposure calculator 220 and the basis exposure calculator 230 of the liquidity charge computing device, may distinguish between on-the-run/off-the-run indices and single names based on trading volume data, where the different credit default swaps have different levels of liquidity. The model may also differentiate between outright and market (e.g., risk) neutral portfolios, account for an effect of tenors associated with different CDS swaps held in the portfolio on liquidity, and may scale superlinearly (e.g., a 1.5 exponential equation) as a function of notional to account for a concentration of risk. In some cases, the model may incorporate weekly trading volume data from the Depository Trust & Clearing Corporation (DTCC), to differentiate between corporate obligors, on-the-run indexes, and/or off-the-run indexes. In some cases, the model may account for an effect of tenor on liquidity.

Figure 3:
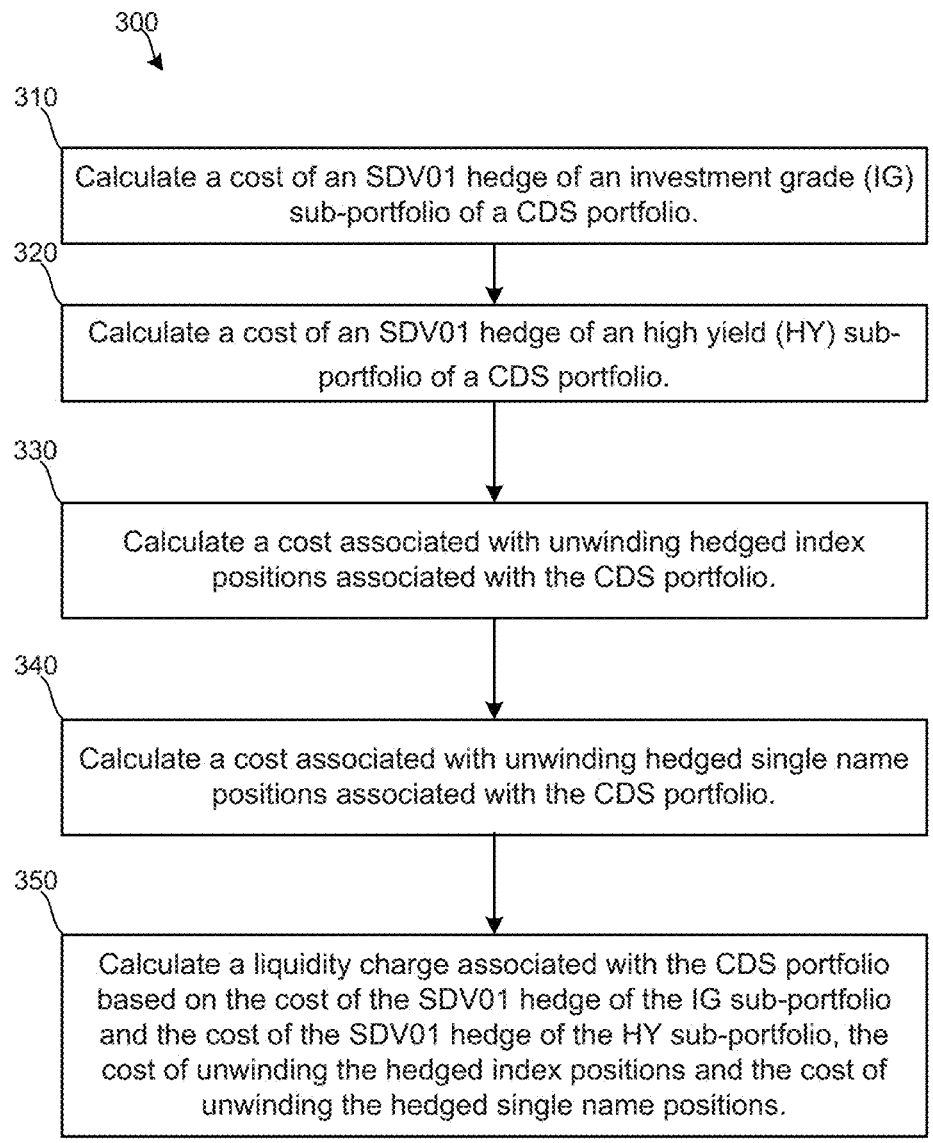
FIG. 3 shows an illustrative method for determining a liquidity charge according to at least some embodiments.

FIG. 3 shows an illustrative method 300 for determining a liquidity charge according to aspects of this disclosure. As discussed above, the liquidity charge computing device 210 may process instructions to calculate a liquidity charge, such as by using equation (1) discussed above. For example, at 310, the outright exposure calculator 220 may calculate a cost associated with a SDV01 hedge corresponding to an IG sub-portfolio of a CDS portfolio. Similarly, at 320, the outright exposure calculator 220 may calculate a cost associated with a SDV01 hedge corresponding to a HY sub-portfolio o the CDS portfolio. For example, a scalar value (e.g., $\alpha$, $\beta$, etc.) may be calibrated to one or more dealer polls associated with the representative CDS portfolios. In some cases, the SDV01 hedge value may be calculated at the CDS portfolio level, such as by determining an SDV01 for each position of the portfolio. The SDV01 may be a measure of sensitivity of each CDS to a 1% change in a power spread curve corresponding to the contract. The IG exposure calculator 222 may calculate the exposure for the IG sub-portfolio based on a SDV01 determined based on an on-the-run CDS swap having a 5-year tenor. This SDV01 ($SDV01_{IG}$) may be used to determine an amount of notional corresponding to the on-the-run, 5-year CDS required to hedge the SDV01 exposure of the overall IG sub-portfolio. In some cases, a CDS may roll periodically (e.g., March, September), and in such cases, the calculations will roll (e.g., be based on) the new series. In some cases, an adjustment value, $w(\tau)$ may be used to calibrate the calculation based on a particular tenor (e.g., a 5-year tenor). This adjustment value may be calibrated based on dealer surveys on a periodic (e.g., semi-annual) basis. In some cases, such as for large CDS portfolios, the IG outright exposure may scale super-linearly, such as by a factor of 1.5. In other cases, such as for small CDS portfolios, the IG outright exposure may scale linearly, such as by using a maximum value. Additionally, the outright exposure calculator may further scale the outright exposure using a median trading volume parameter, such as a trading volume as reported by the DTCC.

At 330, the liquidity charge computing device 210 may calculate a cost associated with unwinding one or more hedged index positions associated with the CDS portfolio, such as by using the basis exposure calculator 230. At 340, the liquidity charge computing device 210 may calculate a cost associated with unwinding one or more hedged single name positions associated with the CDS portfolio, such as by using the basis exposure calculator 230. At 350, the liquidity charge computing device 210 may calculate a liquidity charge associated with the CDS portfolio based on the cost of the SDV01 hedge of the IG sub-portfolio and the cost of the SDV01 hedge of the HY sub-portfolio, the cost of unwinding the hedged index positions and the cost of unwinding the hedged single name positions. In some cases, the liquidity charge computing device 210 may communicate the calculated liquidity charge via the network 205 to the clearinghouse computing system 240. The clearinghouse computing system 240 may use the liquidity charge in one or more calculations to determine margining requirements corresponding the CDS portfolio. The clearinghouse computing system 240 may further communicate the margining requirements to an account owner of the account containing the CDS portfolio and/or a financial institution associated with the CDS portfolio.

Figure 4:
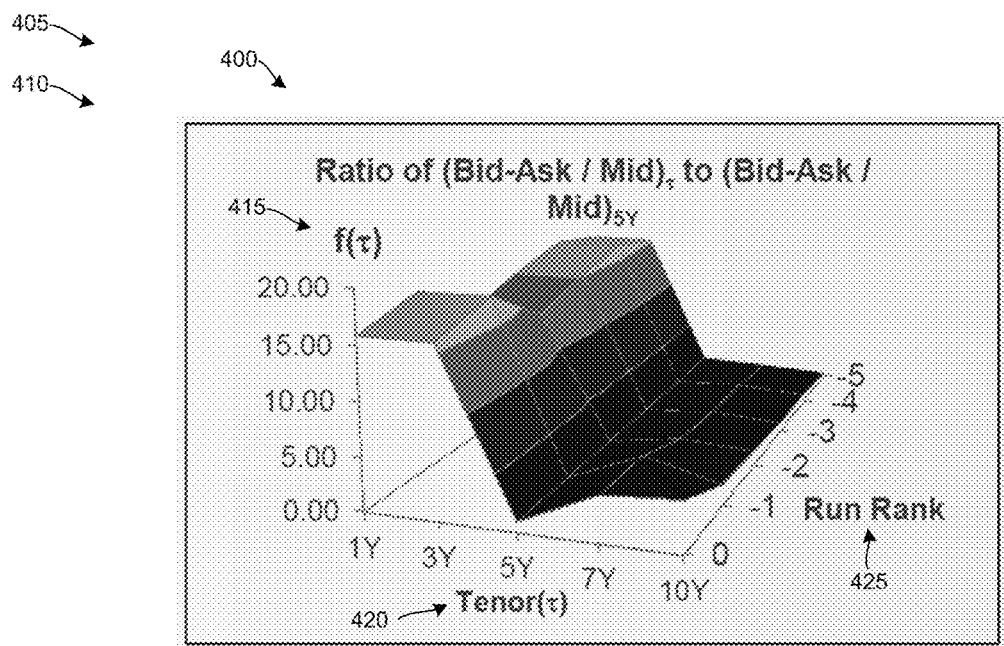
FIGS. 4 and 5 show illustrative charts for calibrating an aspect of the liquidity charge associated with a credit default swap according to at least some embodiments.
Figure 5:
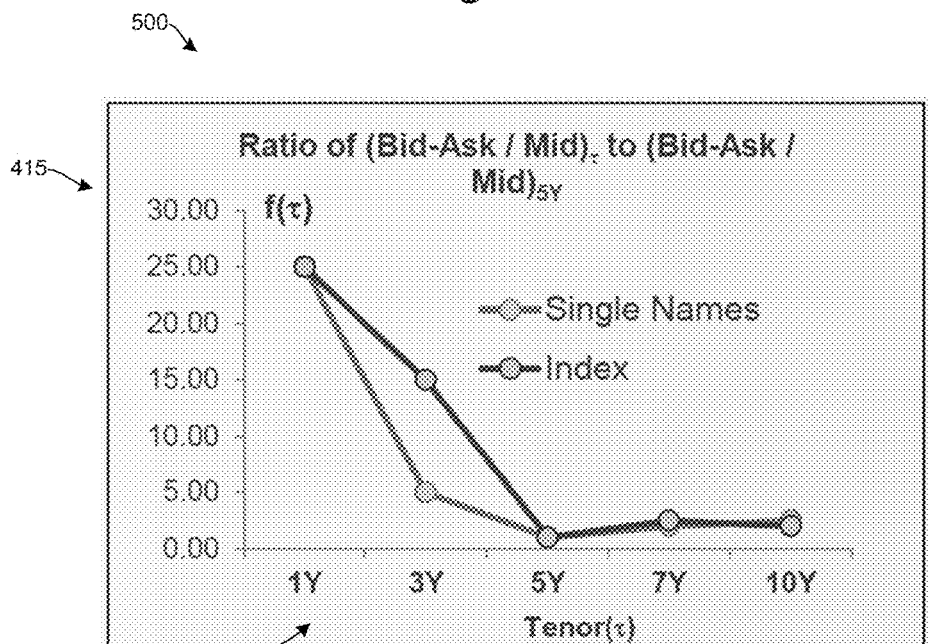

FIGS. 4 and 5 show illustrative charts 400, 500 for calibrating an aspect of the liquidity charge associated with a credit default swap portfolio. In chart 400, a ratio of (Bid-Ask/Mid) values associated with a particular tenor (e.g., 1-year, 3-year, 5-year, 7 year, 10-year, etc.) are compared to a value of a (Bid-Ask/Mid) ratio associated with a 5-year tenor over one or more different run-rank series. The surface 410 represents the ratio (e.g., $f(\tau)$ 415) across the different tenors 420 and different run ranks 425. The run ranks correspond to an on-the-run series (e.g., 0) and different off-the-run series (e.g., −1 year, −2 year, etc.). The chart 500 shows an illustrative (Bid-Ask/Mid) ratio $f(\tau)$ 415 associated with different tenors 420 over a particular run-rank series, such as the on-the-run series.

In some cases, these ratios for indexes may be calibrated to recent (e.g., weekly, monthly, semiannual, etc.) poll results and ratios for single names may be calibrated to historical data. For example, ratios for single name credit default swaps may be calibrated to historical poll data during a specified time frame, such as by using a preceding year's poll results. In some cases, additional calibration may be done by calculating a run-rank specific tenor scalar function for indexes and/or by polling on single name bid/ask spreads across tenors for calibration of single name tenor dependence, and/or the like.

Figure 6:
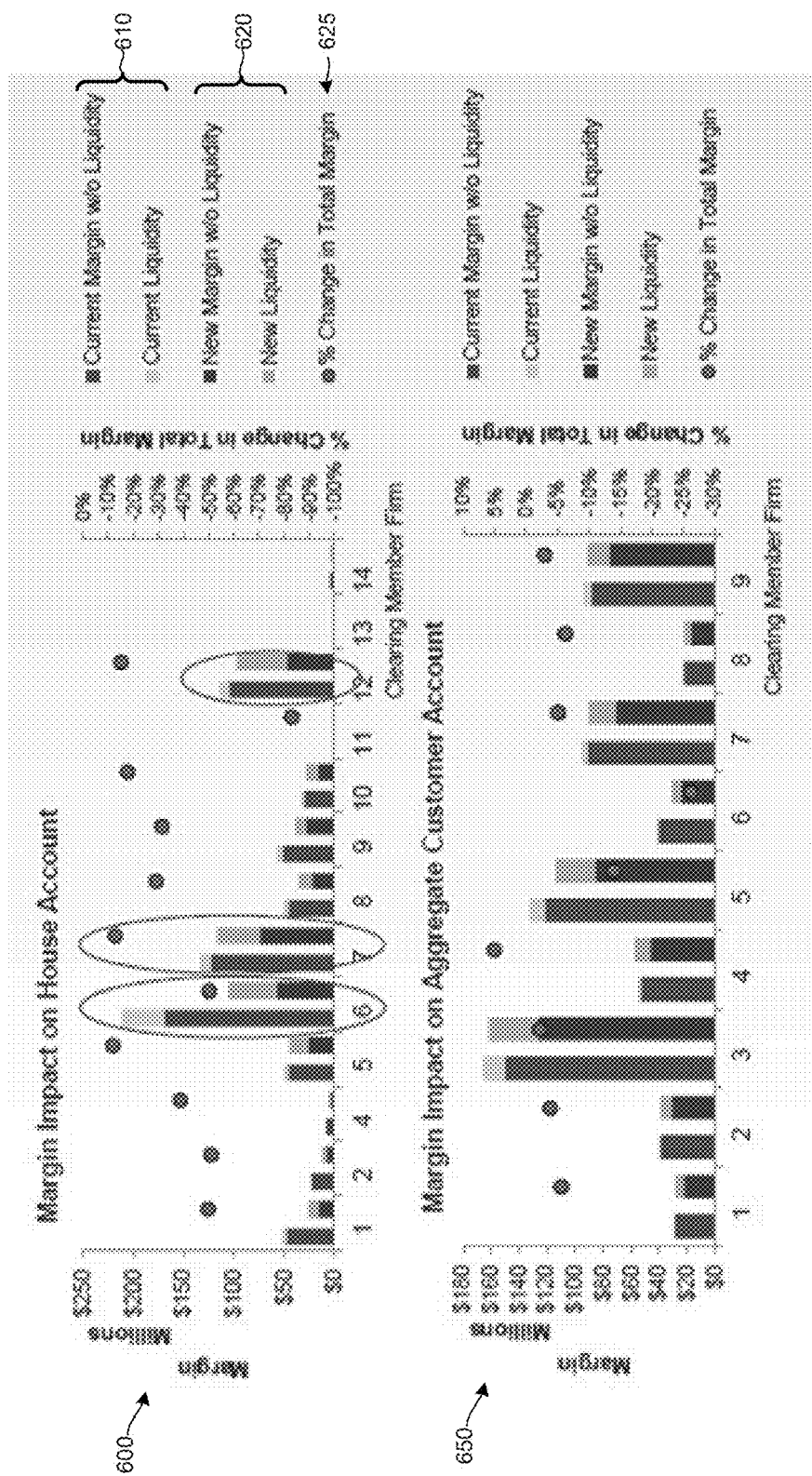
FIGS. 6-10 show illustrative charts showing an impact on margin accounts according to at least some embodiments.

FIGS. 6-10 show illustrative charts showing an impact on margin accounts based on use of a model according to aspects of the invention. For example, FIG. 6 shows an illustrative chart 600 representing a margin impact on a house account of a plurality of clearing member firms 605. An illustrative chart 650 represents a margin impact on aggregate customer accounts for a plurality of clearing member firms 605. For each firm, margin and liquidity 610 are shown based on calculations using a previous model and new margin and new liquidity 620 are shown based on the model discussed above, as implemented using the liquidity charge computing device 210. Additionally, for each of the clearing member firms 605, a change in total margin 630 is shown between the margin and liquidity 610 calculated using the previous model and the new margin and new liquidity 620 calculated using the new model. As can be seen in chart 600, for house accounts, margin requirements including liquidity charges, have been reduced using the new model by at least 10%, with an average of about a 30% reduction in margin costs. For customer accounts, margin requirements including liquidity charges have mostly been reduced from about 2% to about 10%.

Figure 7:
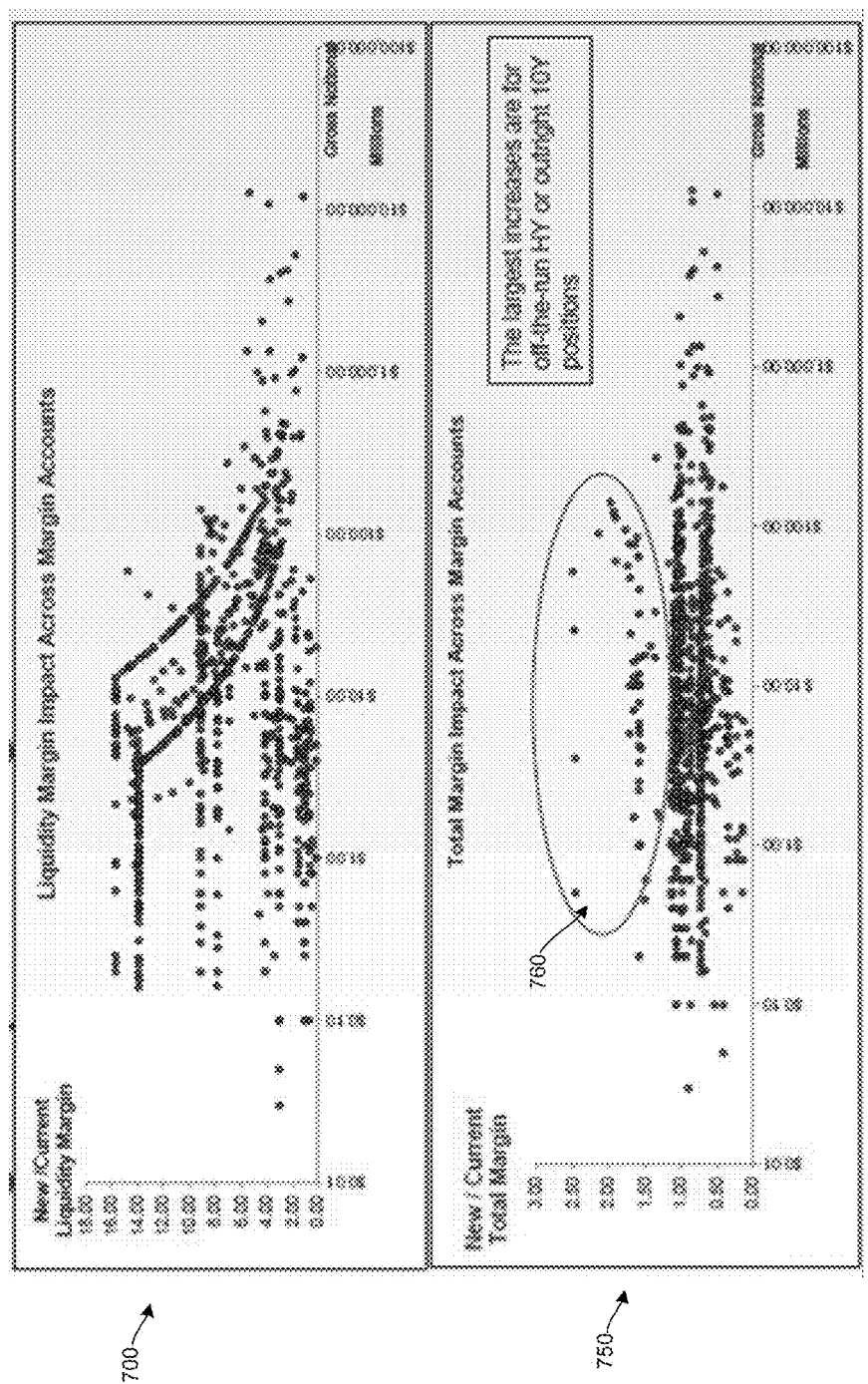

Chart 700 of FIG. 7 shows an impact of liquidity margin across margin accounts as a ratio of the newly calculated liquidity margin to the liquidity margin calculated using a previous model. As can be seen, in many cases, liquidity margin has increased using the new model. As can be seen in chart 750, the largest increases 760 in total margin have been seen in credit default swaps having the most associated liquidity risks, such as in off-the-run HY or outright 10Y positions.

Figures 8, 9:
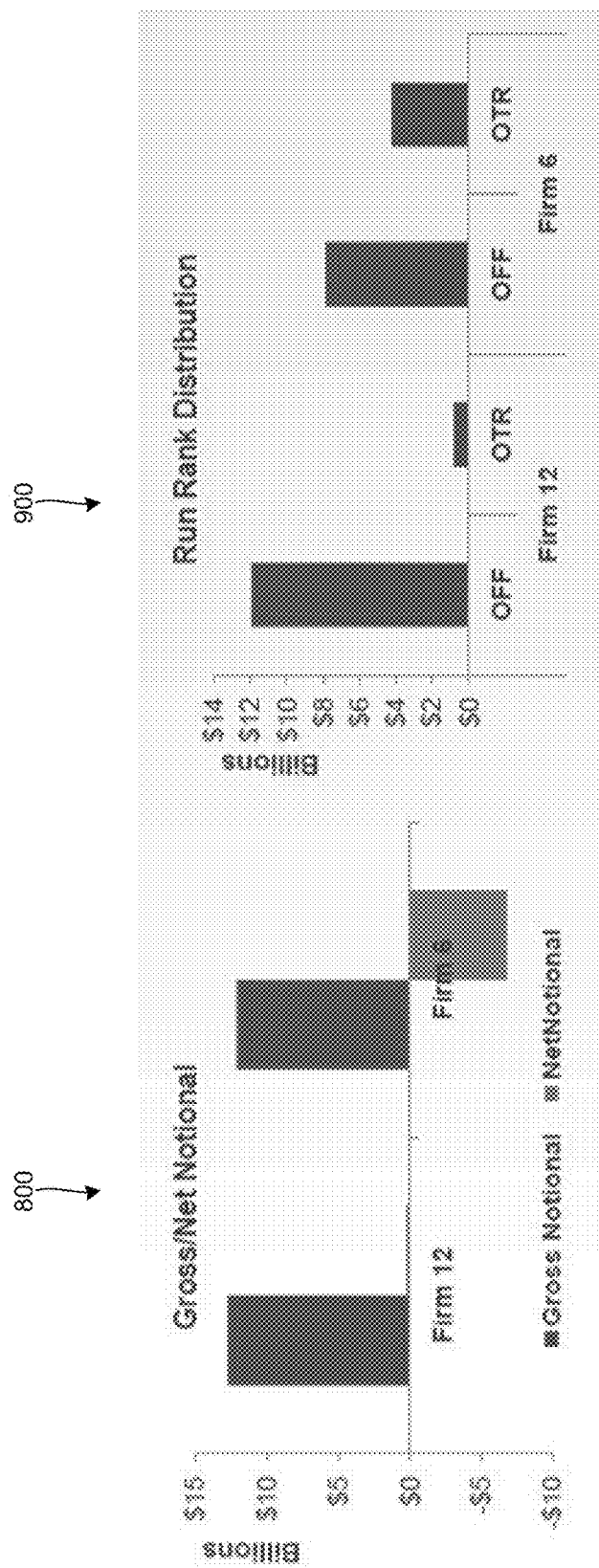

FIGS. 8 and 9 show illustrative charts 800, 900 illustrating changes seen in the margin accounts for firm 6 and firm 12 using the liquidity charges calculated by the liquidity charge computing device 210. For example, for both firm 6 and firm 12, margins without liquidity have decreased significantly due to decommissioning of the gross notional based curve charge. Also, for both firms, liquidity margins have increased significantly due to off-the-run positions held in their respective portfolios. Because firm 12 has more relative exposure to off-the-run indexes, the liquidity margin increases more than the liquidity margin increase seen by firm 6.

Figure 10:
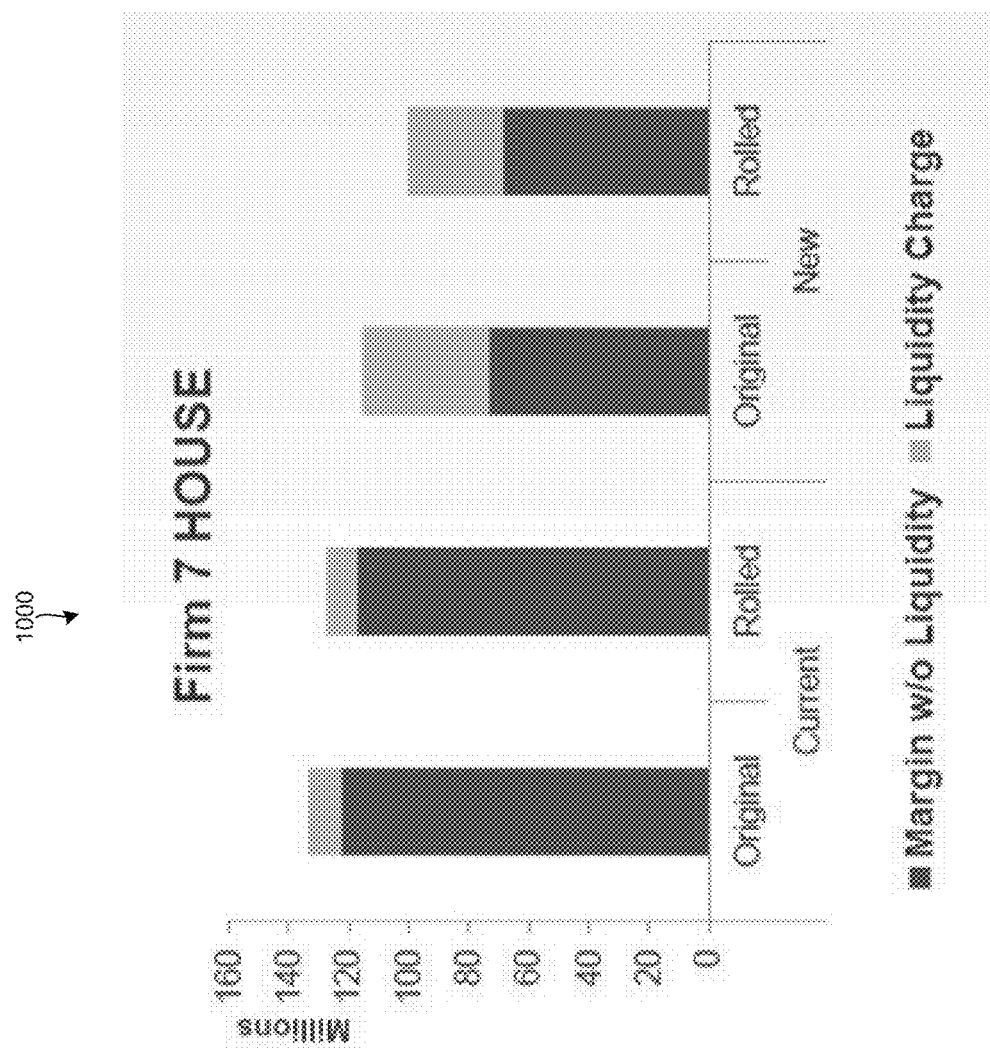

FIG. 10 shows an illustrative chart 1000 showing a rolling effect seen in margin and liquidity requirements. For example, Firm 7 has a relatively hedged portfolio with concentrated positions in IG 18 and IG 20 CDS positions. The liquidity charge, as calculated using equation 1 by the liquidity charge computing device 210, drops significantly when the concentrated positions are rolled to IG 20 and IG 21 CDS positions. Previously, using other methods, the liquidity charge is unaffected by the roll.

Risk Model for Cleared Credit Implementation

In at least some embodiments, the exchange computer system 100 may receive, store, generate and/or otherwise process data to facilitate modeling risk associated with financial products, such as cleared credit financial products, such as credit default swaps. An illustrative modeling method for calculating margin implemented by the exchange computer system 100 may include multiple components, such as a computer device calculating a spread risk requirement, a computer device calculating an idiosyncratic risk requirement, a computer device calculating an interest rate requirement, and a computer device calculating a liquidity risk requirement. The choice, calibration and calculation of these risk requirements may rely on a detailed statistical analysis of the risk factors underlying instruments, such as credit default swap (CDS) instruments. The illustrative risk model (e.g., the RMCC) may be implemented by the exchange computer system 100 to use daily log changes in credit spreads as spread risk factors. For single names the spread changes may be calculated for the standard benchmark tenors at 1, 3, 5, 7, and 10 years. In some cases, the RMCC may include both a margin model and a stress model, where each model included in the RMCC may be implemented by a computing device included in the exchange computing system.

Figure 11:
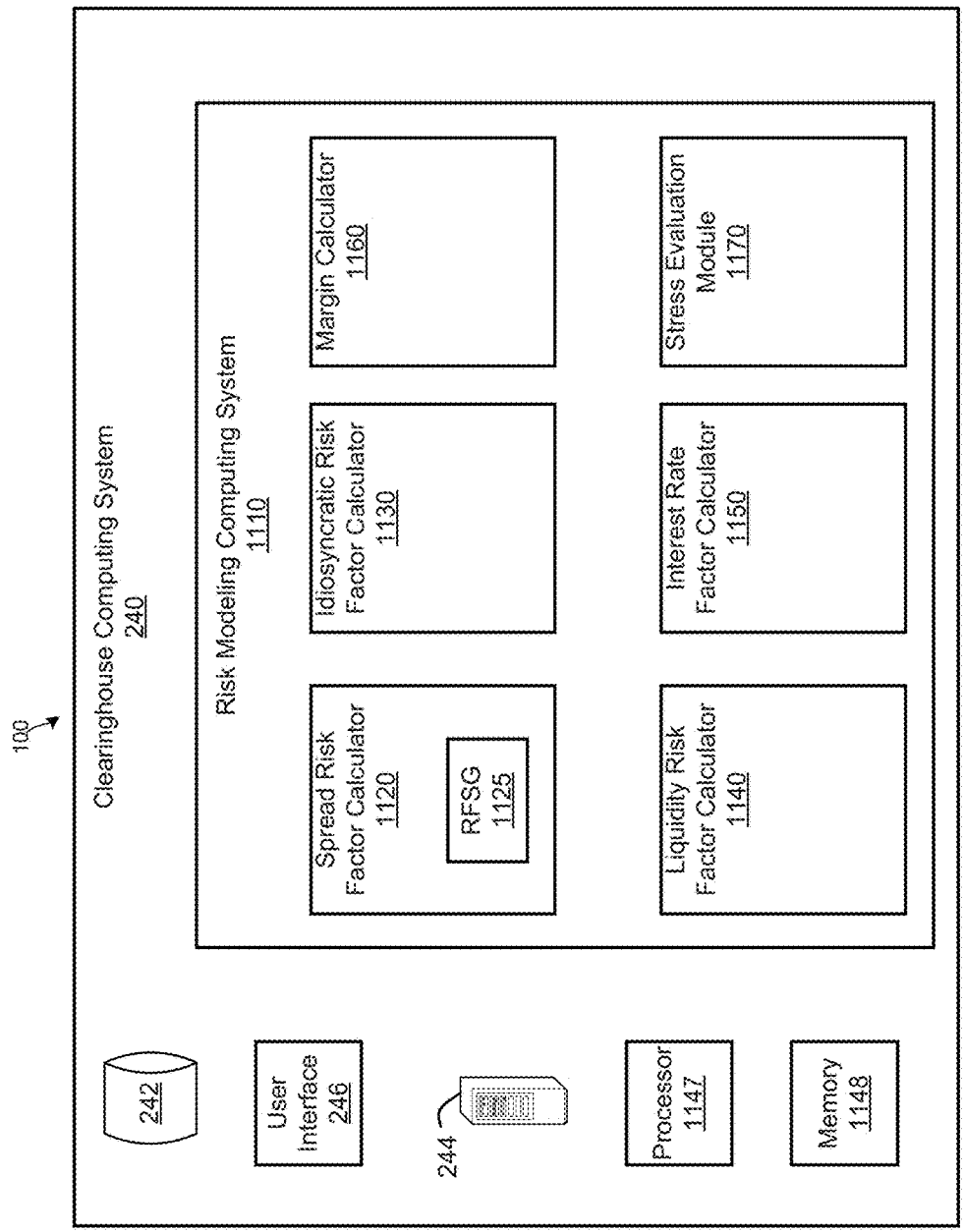
FIG. 11 shows an illustrative block diagram of a clearinghouse computing system for generating and applying a risk model to determine margin requirements of a credit default swap portfolio according to at least some embodiments.

FIG. 11 shows an illustrative block diagram of the clearinghouse computing system 240 for generating and applying a risk model to determine margin requirements of a credit default swap portfolio according to at least some embodiments. In some cases, the clearinghouse computing system 240 may be configured to implement the clearinghouse module 140 of the exchange computing system 100. As discussed above, the clearinghouse computing system 240 may include the data repository 242, the one or more computing devices 244 and/or the user interface 246. In some cases, the clearinghouse computing system 240 may further include the processor 1147 and the memory 1148, which may be incorporated within the one or more computing devices 244 or within another computing device, such as a risk modeling computing system 1110. In some cases, the risk model generator 110 may be configured to retrieve instructions stored in the memory 1148 to be processed by the processor 1147 to implement one or more aspects of the risk model for cleared credit. For example, the risk modeling computer system 1110 may include a spread risk factor calculator 1120, an idiosyncratic risk factor calculator 1130, a liquidity risk factor calculator 1140 (e.g., the liquidity risk calculator 210 discussed above) and/or an interest rate factor calculator 1150. In some cases, the spread risk factor calculator 1120 of the risk modeling computing system 1110 may further include a risk factor scenario generator 1125 to determine a total spread risk requirement of the RMCC. In some cases, the risk modeling computer system 1110 may include a margin calculator 1160 that may process instructions for calculating a margin requirement of a portfolio of credit default swaps or a portion of a portfolio including one or more credit default swaps. The risk modeling computer system 1110 may further be used for performing stress calculations on one or more cleared credit products, such as a portfolio including single name credit defaults swaps and/or index credit default swaps.

The risk modeling computing system 1110 may be communicatively coupled to the user interface 246, which may be local to the clearinghouse computing system 240 and/or remote from the clearinghouse computing system. In such cases, the user interface 246 may present data received from the risk modeling computing system 1110 using one or more user interface screens that may be loaded from a data repository, such as the data repository 242. The risk modeling computing system 1110 may be configured to format information output by one or more of the spread risk factor calculator 1120, the idiosyncratic risk factor calculator 1130, the liquidity risk factor calculator 1140 and/or the interest rate factor calculator 1150. In some cases, the risk modeling computing system 1110 may format the data output into a form (e.g., text, graphics, a combination of text and graphics, etc.) as defined by a particular user interface screen. In some cases, the risk modeling computing system 1110 may be configured to receive, via a communications network, information for use in determining the RMCC, performing stress tests on the RMCC, and/or for one or more calibration processes. Such information may be received from a user via the user interface and/or received from a remote computer system (e.g., the CDS market computing system 230, such as receiving information corresponding to a credit default market, such as pricing information, tenor information, interest rate information and the like.

The data repository 242 may store instructions, that when executed by the one or more computing devices 244, may cause the one or more computing devices 244 to perform operations associated with determining performance bond contributions associated with holdings in products that are based on various types of credit default swaps. In some cases, the clearinghouse computing system 240 may present performance bond and/or margining information based on the calculations performed by the risk modeling computing system 1110 to a financial institution via the network 205, wherein the financial institution holds one or more portfolios that include a credit default swap. Further, the clearinghouse computing system 240 may further present the performance bond and/or margining information via one or more user interface screens via the user interface 246. The user interface screens may graphically and/or textually present information corresponding to a margin requirement determined for a CDS portfolio as determined by the risk modeling computing system 1110.

In some cases, the margin model of the RMCC may allow for a clear model calibration process to be performed by the exchange computing system 100 that may lead to stability of the model parameters over time. For example, the exchange computing system 100 may process instructions that set forth clear policies regarding parameter calibration and/or by justifying all model parameters based on empirical data, such as by liquidity charge computing device 210 as discussed above in reference to FIGS. 1-10. A portfolio level liquidity model may be included in the RMCC and may be applicable to both single names and indices. Unlike some existing liquidity models, this liquidity model may be applicable to both small and/or large portfolios. Further, the liquidity model may allow for limiting market liquidity in a crisis situation. Further, the RMCC may be flexible enough so that it may offer cross asset offsets that may assist in portfolio margining with correlated instruments.

Figure 12:
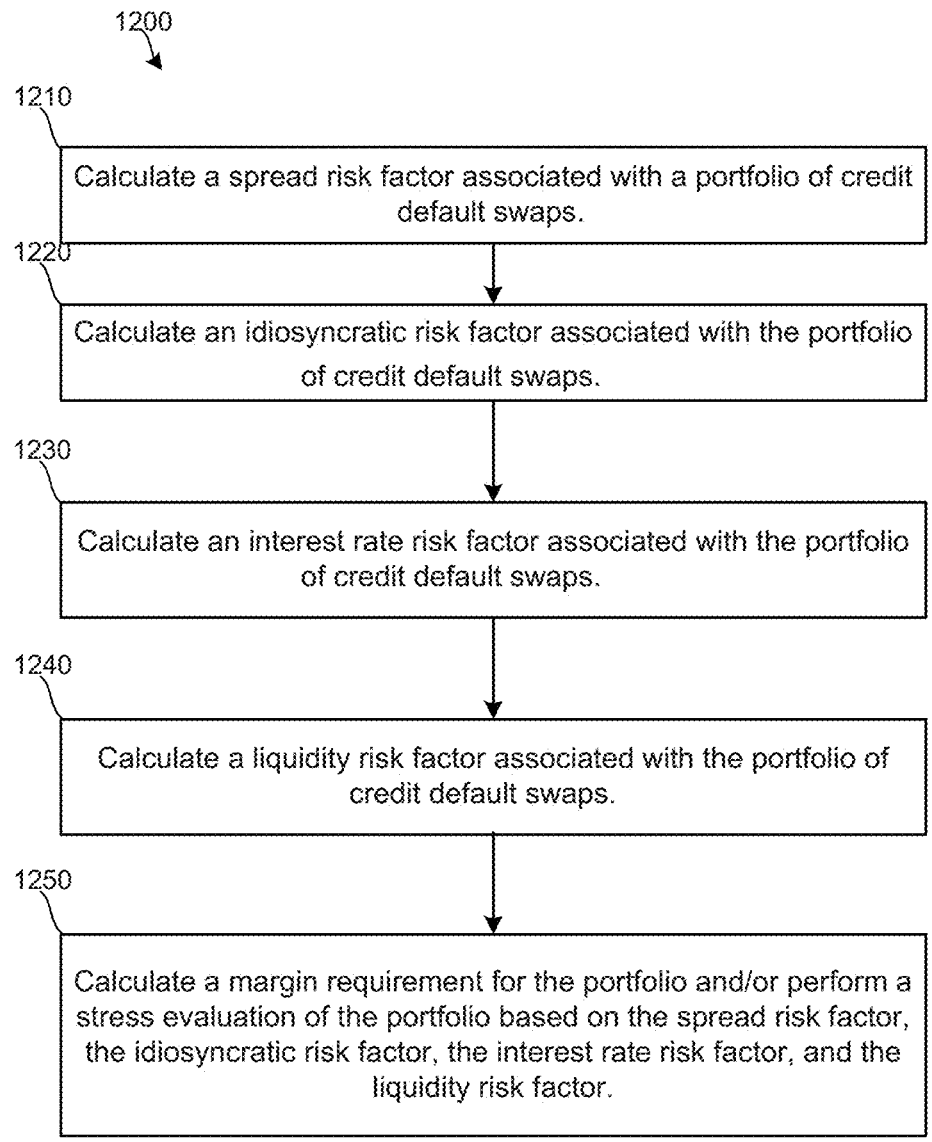
FIG. 12 shows an illustrative method for generating a model for determining margin for a credit default swap portfolio according to at least some embodiments.

FIG. 12 shows an illustrative method of determining a margin requirement associated with a portfolio of credit default swaps and/or for performing a stress evaluation of the portfolio of credit default swaps according to one or more embodiments. In some cases, the risk modeling computer system 1110 of the clearinghouse computing system 240 may be configured to calculate, such as by using the spread risk factor calculator 1120, a spread risk factor corresponding to a value at risk (VaR) associated with a plurality of correlation scenario sets, such as at 1210. The correlation scenario sets may correspond to characteristics of at least one of a single name credit default swap or an index credit default swap of a portfolio. In some cases, the spread risk factor calculator 1120 may be configured to model a plurality of risk factors associated with the portfolio by evaluating one or more possible scenarios related to different credit default swaps associated with the portfolio. In some cases, the different possible scenarios may be evaluated using one or more families of equations as part of the risk model processed by the risk modeling computing system. For example, the spread risk factor calculator may evaluate a plurality of scenarios using one or more different methods, such as a Monte Carlo simulation. In some cases, the Monte Carlo simulation may be run for each of the plurality of scenarios to obtain a distribution associated with the risks associated with single name credit default swaps and credit default swap indices associated with the portfolio. The Monte Carlo simulation processed by the spread risk factor calculator 1120 may be used to process a plurality of risk factors associated with the portfolio with one or more degrees of freedom (e.g., 2, 3, 4, 5, etc.). In some cases, the Monte Carlo simulation may include one or more student t-copulas, wherein an output from a symmetric t-copula may be scaled using a corresponding marginal t-distribution and/or forecasted EWMA volatility.

In some cases, a Monte Carlo method may define a domain of possible inputs such as correlation scenarios that may be generated by the risk factor scenario generator 1125. In some cases, the salient characteristics of risk factors may include non-uniform autocorrelations across tenors and/or entities, heteroscedasticity, varying degrees of heavy tails (e.g., observed, but having statistically weak symmetry), stable average correlations between single names, indices and between a single name and an index. In some cases, the risk factors may have strong correlation across tenors and/or strong dependence across an on-the run index and an off-the-run index of the same index family. In some cases, a correlation may break down in a distressed market. Further, jumps, such as a default or a drastic improvement in credit quality may impact the calculations. In some cases, the different risk factors may be interdependent where a movement in one risk factor may be reflected in a movement in another risk factor. As such, the spread risk factor calculator 1120 may use one or more correlation matrices (e.g., a high correlation matrix, a low correlation matrix, a base correlation matrix) to add countercyclicality to facilitate modeling of joint movement of different risk factors.

Figure 18:
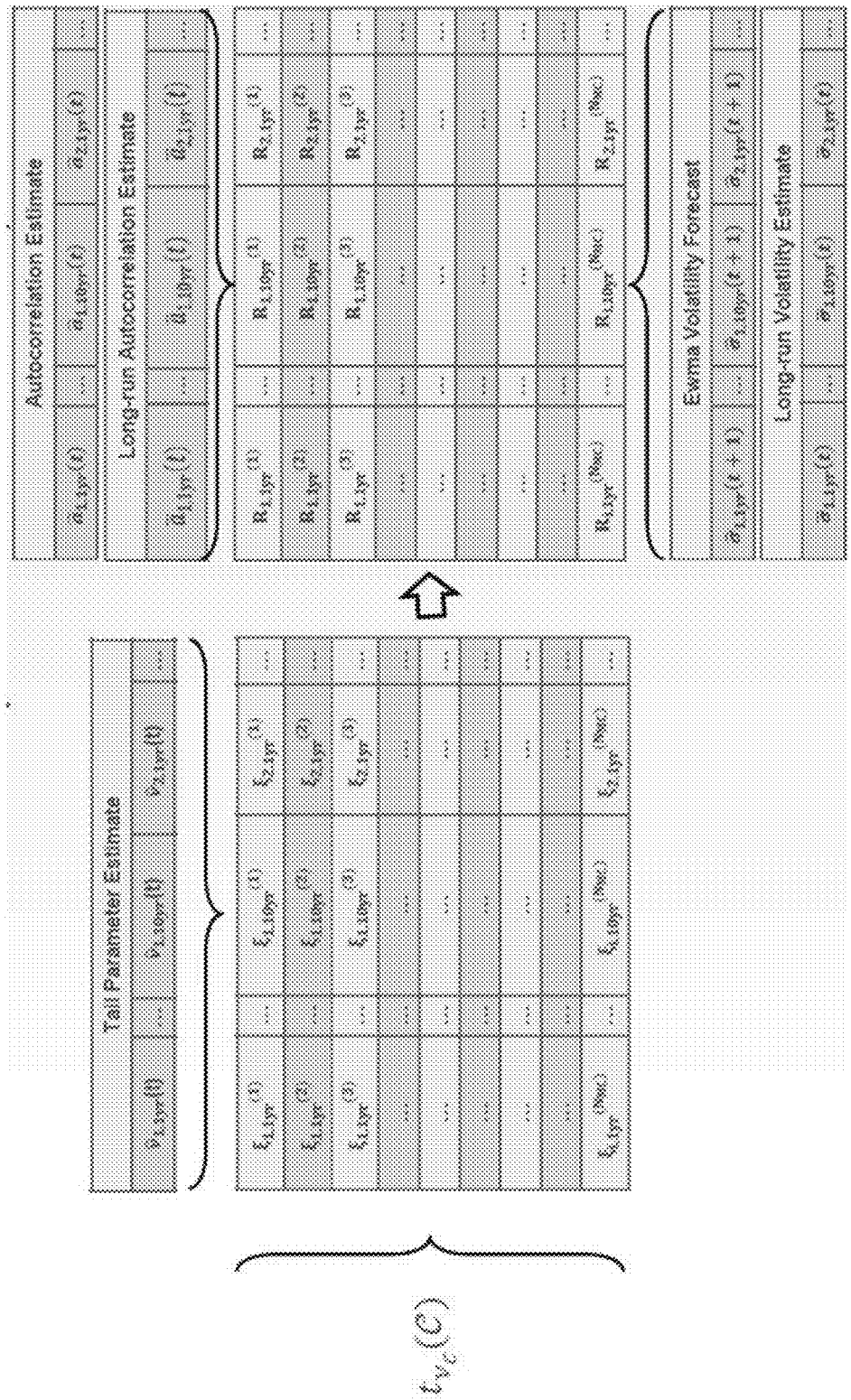
FIG. 18 shows an illustrative block diagram representation of an risk factor scenario generator according to at least some embodiments.

In some cases, the risk factor scenario generator 1125 may generate scenarios that may be associated with one or more correlation matrices. For example, the risk factor scenario generator 1125 may generate one or more scenarios that may reflect the different risk factors, such as tail parameter estimates, autocorrelation estimates, long-run autocorrelation estimates, EWMA volatility forecasts, and/or long-run volatility estimates, and the like, such as those shown in FIG. 18. In some cases, the risk factor scenario generator 1125 may receive, at an input one or more correlation scenarios, such as a historical correlation matrix, a high correlation matrix, and/or a low correlation matrix. In some cases, one or more of the historical correlation matrix, high correlation matrix or low correlation matrix may be calculated internally by the risk factor scenario generator 1125. In some cases, the spread risk factor calculator 1120 and/or the risk factor scenario generator may determine a historical VaR based on the historical correlation matrix, a basis VaR based on the low correlation matrix, and a systematic VaR based on the high correlation matrix. The spread risk factor calculator 1120 may then calculate a spread risk factor based on the historical VaR, the basis VaR and the systematic VaR. For example, the spread risk factor calculator 1120 may calculate the spread risk factor as a sum of the base spread risk factor (e.g., $VaR_{Base}$) and a maximum value of either a basis risk requirement (e.g., $VaR_{Basis} - VaR_{Base}$) or a systematic risk requirement (e.g., $VaR_{systematic} - VaR_{Base}$). In some cases the determined maximum value may be multiplied by a scalar $\alpha$, where $\alpha$ may be an integer or a fraction.

In some cases, the spread risk factor calculator 1120 may be configurable to determine the spread risk factor differently for margin calculations and stress evaluations. For example, the spread risk factor calculator 1120 may be configured to receive an input (e.g., received via a user interface screen displayed on the user interface 246) defining whether a margin calculation is being performed, such as by the margin calculator 1160, or whether a stress evaluation is being performed, such as by a stress evaluation module 1170. Based on this input, the stress evaluation module 1170 may determine a stress spread risk factor as a sum of the historical VaR, and a fraction of maximum of either the basis VaR or the systematic VaR, wherein a first quantile of P&L distribution associated with a stress spread risk factor is greater than a second quantile of P&L distributions associated with a margin spread risk factor.

At 1220, the risk modeling computer system 1110 and/or the idiosyncratic risk factor calculator 1130, may calculate an idiosyncratic risk factor corresponding to a jump-to-default (JTD) charge and/or a jump-to-health (JTH) charge associated with the portfolio. In some cases, the idiosyncratic risk factor calculator 1130 may process instructions that cause the idiosyncratic risk factor calculator 1130 to calculate an overall portfolio VaR associated with the portfolio. In some cases, a JTD value-at-risk (VaR) associated with each single name position associated with the portfolio may be calculated. Each JTD VaR comprises a default charge associated with a particular single name position and a remaining portfolio VaR corresponding to a remaining portion of the portfolio after removing the particular single name position. Further, a maximum JTD VaR of the JTD VaR associated with each single name position may also be calculated. The idiosyncratic risk factor calculator 1130 may then calculate the JTD charge as a difference between the maximum JTD VaR and the overall portfolio VaR. Similarly, the idiosyncratic risk factor calculator 1130 may calculate a JTH value-at-risk (VaR) associated with each single name position associated with the portfolio. For example, each JTH VaR comprises a default charge associated with a particular single name position and a remaining portfolio VaR corresponding to a remaining portion of the portfolio after removing the particular single name position. A maximum JTH VaR of the JTD VaR associated with each single name position may be calculated for use in calculation a JTH charge. The JTH charge may be calculated as a difference between the maximum JTH VaR and the overall portfolio VaR.

In some cases, the idiosyncratic risk factor calculator 1130 may calculate the remaining portfolio VaR associated with the portfolio after removing the particular single name position. In doing so, each index position in the remaining portion of the portfolio may be adjusted to account for the removal of the particular single name position. Further, the default charge associated with the particular single name position may be calculated as a difference between a current price of the particular single name position and a minimum recovery rate observed through a history associated with the particular single name position.

If the idiosyncratic risk factor calculator 1130 is calculating the idiosyncratic risk associated as part of a margin requirement calculation associated with a CDS portfolio, the margin JTD charge associated with the portfolio may be calculated based on a historical correlation scenario set, wherein the margin JTD charge is used in calculating a margin requirement associated with the portfolio. The margin JTH charge associated with the portfolio based on a historical correlation scenario set, wherein the margin JTH charge is used in calculating a margin requirement associated with the portfolio In performing a stress calculation corresponding to the CDS portfolio, one or more different data sets may be used in calculating a stress JTD charge. For example, a historical JTD charge may be calculated using a historical correlation scenario set, a basis JTD charge may be calculated using a basis correlation scenario set, a systematic JTD charge may be calculated using a systematic correlation scenario set and a stress JTD charge associated with the portfolio may be calculated as a maximum of the historical JTD charge, the basis JTD charge and the systematic JTD charge. In some cases, the stress JTD charge is used in determining a stress requirement associated with the portfolio. A stress JTH charge associated with the portfolio may be calculated as a maximum of a historical JTH charge calculated using a historical correlation data set, the basis JTD charge calculated using a basis correlation data set and the systematic JTD charge calculated with a systematic correlation data set, wherein the stress JTD charge is used in determining a stress requirement associated with the portfolio.

At 1230, the risk modeling computer system 1110 may calculate, such as by using the interest rate risk factor calculator 1150, an interest rate risk factor corresponding to losses associated with the portfolio due to a change in interest rates. In some cases, the interest rate risk factor calculator 1150 may calculate an up-shock loss associated with an up shock to an interest rate curve used in CDS pricing and calculate a down-shock loss associated with a down shock to the interest rate curve used in CDS pricing. The interest rate risk factor calculator 1150 may then calculate the interest rate risk factor as a maximum of the up-shock loss and the down-shock loss. In some cases, the size of the up-shock and a size of the down shock may be calibrated to a reference pivot rate.

At 1240, the risk modeling computer system 1110 may calculate, such as by using the liquidity risk factor calculator 1140, a liquidity risk factor corresponding to a liquidity charge associated with the portfolio. In some cases, the liquidity risk factor calculator 1140 may be configured to process instructions as described above in regards to FIG. 3. For example, the liquidity risk factor calculator 1140 (e.g., the liquidity charge computing device 210) may be configured to calculate an outright exposure to an investment grade (IG) sub-portfolio of the portfolio, calculate an outright exposure to a high yield (HY) sub-portfolio of the portfolio, calculate a basis exposure to at least one of an index-based CDS sub-portfolio and a basis exposure to a single name CDS sub-portfolio of the portfolio, and calculate the liquidity risk factor based on the outright exposure of the IG sub-portfolio, the outright exposure of the HY sub-portfolio and the basis exposure of the CDS portfolio.

In some cases, the liquidity risk factor may represent a requirement designed to capture the liquidity and concentration premium that a clearinghouse may have to pay during liquidation of the credit portfolio of a defaulted member. This premium may be proportional to the loss that the buyer anticipates to incur over the period required to unwind the portfolio. For large positions, this loss may scale super-linearly by the number of days liquidation will take at a constant unwinding rate and, therefore, by the position size. There are theoretical and/or empirical justifications for appropriately selecting the position size scaling exponent for liquidity charge at 1.5.

For a portfolio of credit instruments, the buyer may anticipate the costs associated with hedging the outright exposure of sub portfolios with the corresponding most liquid credit instruments. For example, for IG index and single name sub-portfolios, an IG OTR 5-year instrument may be used. Similarly, for HY index and single name portfolios, a HY OTR 5-year instrument may be used. The costs associated with liquidation of the hedged portfolio may depend on the liquidity profile of the basis position (e.g., OTR/OTR-1 5-year versus OTR 5-year/OTR-10 10-year, etc.). The proposed liquidity requirement takes into account position specific liquidity characteristics such as spread volatility of the underlying entity's most liquid tenor (e.g., loss during liquidation), weekly trading volume of the underlying name (e.g., concentration), and spread risk sensitivity of the underlying entity (SDV01).

In some cases, the liquidity charge computing device (e.g., the liquidity risk factor calculator 1140 of FIG. 11) may calculate the liquidity charge as a sum of different charges. In an illustrative example, the liquidity charge may be calculated as a sum of 4 charges, LC=(1)+(2)+(3)+(4). In this example, the first two terms of the equation may equal $$(1)+(2)=\alpha_{1,IG}*abs(SDV_{IG})^{1.5}+\alpha_{1,HY}*abs(SDV_{HY})^{1.5}$$

For example, element (1) may be the cost for hedging the IG sub-portfolio with an OTR IG 5Y index, where $SDV_{IG}$ may be the SDV01 of the IG sub-portfolio. In other words, the this first term may represent a cost associated with IG indices and IG single names that are hedged using IG index Similarly, (2) may be the cost for hedging the HY sub-portfolio with an OTR HY 5Y index, where $SDV_{HY}$ may be the SDV01 of the HY sub-portfolio, In other words, this second term may be represent a cost associated with HY indices and HY single names which are hedged using HY index After step (1) and (2), the portfolio may be considered to be SDV01 neutral. At such time, the portfolio may be split into hedged "buckets" that will be liquidated with a speed dependent upon the trading volume of the hedged instruments. For example, as the trading volume of the underlying instrument increases, the liquidation speed may be increased. Similarly, as the trading volume of the underlying instrument decreases, the liquidation speed may be decreased.

$$(3) = \sum_{\substack{i \in IND \\ -IG\,OTR\,5Y \\ -HY\,OTR\,5Y}} a_2 * |SDV01_{0i}| * vol_i * \max\left\{\left(\frac{Q_i}{Q_{0i}}\right)^{1.5}, \frac{Q_i}{Q_{0i}}\right\}$$

In (3), $Q_{0i}$ is the run rank based median trading volume over the previous 3 months, $SDV01^{0i}$ is the SDV01 of the index i computed for a notional equal to $Q_{0}$, and $Vol_i$ is the log-return volatility of 5-year index i. Further, the risk related to each position index i, may be represented by the product of the SDV01 and the volatility and the liquidity of each index position i may be represented by the trading median volume $Q_{0i}$. In some cases, the IG and HY OTR 5Y may not be included in the calculation. Rather, these indices may be used as hedges and liquidated as a roll. If Qi<Q0i, then the entire position may be liquidated very quickly (e.g., linear scaling with the notional). However, if $Q_i > Q_{0i}$, then an exponent of 1.5 is applied to represent an increase in the liquidation cost due to the size of $Q_i$ (e.g., a super linear scaling with notional).

$$(4) = \sum_{i \in SN} a_3 * |SDV01_{0i}| * vol_i * \max\left\{\left(\frac{Q_i}{Q_{0i}}\right)^{1.5}, \frac{Q_i}{Q_{0i}}\right\}$$

As can be seen, (4) may be similar to (3), but used for single name positions rather than indices. $Q_{0i}$ is the median trading volume of single name i over the previous 3 months, $SDV01_{0i}$ is the SDV01 of the single name i computed for a notional equal to $Q_0$, and $Vol_i$ is the log-return volatility of 5-year single name i.

At 1250, the risk modeling computer system 1110 may calculate, such as by using the margin calculator 1160, a margin requirement for the portfolio based, at least in part on the spread risk factor, the idiosyncratic risk factor, the interest rate risk factor, and the liquidity risk factor. In some cases, the risk modeling computer system 1110 may perform one or more stress evaluations on the portfolio and calculate a stress requirement associated with the portfolio based, at least in part on the spread risk factor, the idiosyncratic risk factor, the interest rate risk factor, and the liquidity risk factor.

Figure 13:
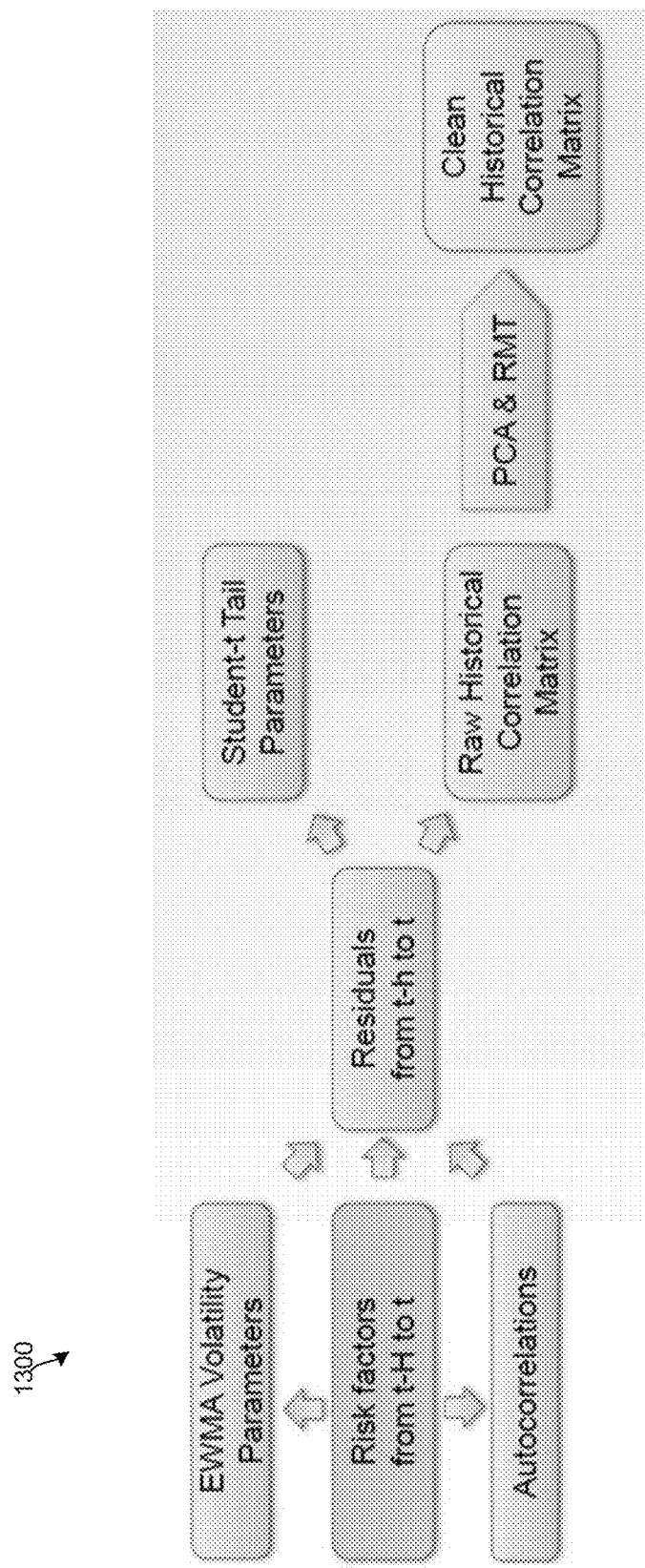
FIG. 13 shows an illustrative risk factor calibration system for use in generating a risk model according to at least some embodiments.

FIG. 13 shows a flow chart illustrative of a risk factor calibration system 1300 for use in generating a risk model according to at least some embodiments. For example, the risk factor calibration system may be incorporated into one or more portions of the clearing house computing system 240, including the risk modeling computing system 1110 and/or the spread risk factor calculator. The risk factor calibration system 1300 may process instructions to calibrate one or more raw risk factors, such as daily log changes in par-spreads for entity and tenor. For example, the risk factor calibration may include an autocorrelation estimation that may include historical volatility estimation of de-autocorrelated risk factors, such as exponential weighted moving average (EWMA) with a decay factor, $\lambda$. The historical risk factors used in these calculations may be obtained from a data repository containing historical market information. The historical risk factors may be obtained for a specified time period (e.g., $t_h - t$). In some cases, t may be any arbitrarily choses date or may be at or near a present date (e.g., within a day, week or month). The risk factors, EWMA volatility parameters, and/or the autocorrelation data may be used in a residual estimation calculation. For example, residual estimation may be performed using de-autocorrelated and/or standardized risk factors (residuals). The residuals for the historical time period may then be used for an estimation of student-t parameters and an estimation of raw factor correlations (e.g., a historical correlation matrix). The raw historical correlation matrix may then be cleaned using one or more methods, such as principal component analysis (PCA) and/or Random Matrix Theory (RMT) to generate a clean historical correlation matrix.

Risk factors may be obtained over a specified time period, such as from a specified historical time (e.g., t-H) to a present time (e.g., t). For example, historical risk factors may be defined as risk factors obtained from a time period between 2008 and 2013. These historical risk factors may be sued to generate a series of EWMA volatility parameters and/or a series of autocorrelations. These parameters, historical values and autocorrelations may then be used to determine residuals for the historical time period. These residuals may then be used to generate a parameter set (e.g., a student-t tail parameter set) and a historical correlation matrix containing raw data. This correlation matrix then may be modified (e.g., cleaned) using one or more different methods, such as PCA or RMT.

Estimation of risk factor distribution may be determined for a given tenor $\tau$ and name I, by processing instructions by a computing device 244 of the clearinghouse computing system 240. In some cases, the name i may correspond to one of a name of an index CDS or a name of a single name CDS. For a given tenor and name:

$$R_{i,\tau}(t) = a_{i,\tau}(t) R_{i,\tau}(t-1) + \sigma_{i,\tau}(t) \varepsilon_{i,\tau}(t) \tag{a}$$

where $R_i(k, t)$ is a daily log-return of the risk factor par spreads, $$R_{i,\tau}(t) = \ln CDS_{i,\tau}(t) - \ln CDS_{i,\tau}(t-1) \tag{b}$$

$a_{i,\tau}(t)$ is an autoregressive AR(1) coefficient for the autocorrelation observed in $R_{i,\tau}(t)$:

$$a_{i,\tau}(t) = \frac{1}{756} \sum_{s=1}^{756} Ri, \tau(t-s+1) * Ri, \tau(t-s)$$

and $\sigma_{i,\tau}(t)$ is a volatility scale factor defined as the EWMA standard deviation of the residuals of AR(1) model:

$$\sigma_{i,\tau}(t) = \frac{1}{\sum_{s=1}^{252} \lambda^{s-1}} \sum_{s=1}^{252} \lambda^{s-1} [X_{i,\tau}(t-2)]^2$$

where $X_{i,\tau}(t)$ is the de-autocorrelated daily log-return $$X_{i,\tau}(t) = R_{i,\tau}(t) - a_{i,\tau}(t) R_{i,\tau}(t-1)$$

Calibration of countercyclical parameters may include $\overline{\sigma}_{i,\tau}(t)$, which is a long-run volatility component which introduces contercyclicality in individual risk factor variations:

$$\overline{\sigma}_{i,\tau}(t) = \frac{1}{N_{i,\tau}(t) - 1} \sum_{s=0}^{N_{i,\tau}(t)-1} R_{i,\tau}(t-s)^2$$

-continued $$\bar{a}_{i,\tau}(t) = \frac{1}{N_{i,\tau}-1} \sum_{s=1}^{N_{i,\tau}-1} R_{i,\tau}(t-s+1) * R_{i,\tau}(t-s)$$

is a long-run autocorrelation estimate which introduces countercyclicality for scaling daily volatility to margin period of risk $C^{low}$ and $C^{high}$ are two correlation matrices which add countercyclicality to modeling of the joint movement of risk factors, where $$C^{low} = \begin{pmatrix} 1 & 0 & 0 & 0 & 0 & 0 \\ 0 & \ddots & \ddots & \ddots & \ddots & \ddots \\ 0 & \ddots & 1 & \ddots & \ddots & \ddots \\ 0 & \ddots & \ddots & 1 & \bar{\rho}_{l,I} & \bar{\rho}_{l,I} \\ 0 & \ddots & \ddots & \bar{\rho}_{l,I} & \ddots & \ddots \\ 0 & \ddots & \ddots & \bar{\rho}_{l,I} & \ddots & 1 \end{pmatrix} \text{ and}$$

$$C^{high} = \begin{pmatrix} 1 & 1 & 1 & 1 & 1 \\ 1 & \ddots & \ddots & \ddots & \ddots \\ 1 & \ddots & \ddots & \ddots & \ddots \\ 1 & \ddots & \ddots & \ddots & \ddots \\ 1 & \ddots & \ddots & \ddots & \ddots \end{pmatrix}$$

In some cases, as part of the scenario generation, a Monte Carlo simulation may be run. For example, for each Monte Carlo simulation, $j=1, \ldots, N_{MC}$, the spread shock to a given tenor $\tau$ of name I (e.g., a single name, an index, etc.) may be given by:

$$R_{i,\tau}^{(j)}(t+n) = [\hat{\sigma}_{i,\tau}(t+1) \vee \hat{\sigma}_{i,\tau}(t+1)]\sqrt{n + 2(n-1)(a_{i,\tau}(t) \vee \bar{a}_{i,\tau}(t) \vee 0)} \, \xi_{i,\tau}^{(j)}$$

where $$\xi_{i,\tau}^{(j)} \sim \sqrt{\frac{\hat{v}_{i,\tau}-2}{\hat{v}_{i,\tau}}} \, t_{\hat{v}_{i,\tau}}-1(\text{Rank}[z_{i,\tau}^{(j)}]), \text{ where}$$

$$z_{i,\tau}^{(j)} \sim t_{v_c}(C) - 1(\text{Rank}[z_{i,\tau}^{(j)}]), \text{ where}$$

$z_{i,\tau}^{(j)} \sim t_{v_c}(C)$ is a simulated multivariate Student-t variable with correlation matrix C and a common degree of freedom of $t_{v_c}$ $\tilde{\sigma}_{i,\tau}(t+1)$ is the EWMA volatility forecast at margin/stress date t, where, for margin calculations $\hat{\sigma}_{i,\tau}(t+1)=\sigma_{i,\tau}(t+1)$ and for stress calculations $\hat{\sigma}_{i,\tau}(t+1)$ is the larger of 99.75% percentile of $\{\sigma_{i,\tau}(s+1)\}_{s \le t}$ and a constant multiple of $\sigma_{i,\tau}(t+1)$ where the constant is calibrated to a cross section of risk factors during a particular year (e.g., 2008, 2009, etc.).

C is set to $C_0(t)$, $C^{low}$ and $C^{high}$ for base, basis and systematic margin requirement calculations, respectively. Further, in some cases, $v_c$ and $N_{MC}$ may be constants (e.g., $v_c=3$ and $N_{MC}=10,000$, etc.).

Idiosyncratic risk requirement

Idiosyncratic risk requirement may be the sum of a Jump-to-Default (JTD) and a Jump-to-Health (JTH) charge. These charges may be add-on risk charges to cover for the default and drastic improvement in credit quality of single names. A calculation of JTD charge may start with removing each single name CDS one at a time from the portfolio. VaR of the remaining portfolio may be calculated after adjusting each index position notional to account for the removal of the single name (reduce notional by a ratio of one over the number of constituents). The default charge for the removed entity may be calculated as the difference between current price and the minimum recovery rate observed through the history of the single name entity. The default charge may be added to the VaR of the remaining portfolio. This calculation may be repeated for each single name that the portfolio has explicit (single name position) or implicit (constituent in an index position) exposure to. The maximum may be taken over all single names to calculate the JTD VaR of the portfolio. The difference between the JTD VaR and the original VaR may be the JTD charge. For margin purposes, this calculation may be done only for the historical correlation scenario set. For stress calculations, the same process may be repeated for historical, low and high correlation scenario sets and the maximum charge may be chosen as the JTD risk requirement.

A calculation of a JTH charge is very similar to that of JTD. One major difference is that there is no JTH charge for pure index portfolios. This may be based on an analysis of index spread changes or index spread basis changes on days when a constituent experiences a drastic improvement in credit quality. For portfolios with single name positions, each single name may be removed from the portfolio one at a time. The remaining portfolio VaR may be calculated and a JTH charge is added to it. The JTH charge may be the difference between the current price of the position and the price of the position in an extreme quantile scenario from the high correlation scenario set. The selection of the scenario from the high correlation scenario set allows us to model the effect of credit improvement across all tenors of the same underlying. The JTH VaR which may be the sum of the remaining portfolio VaR and the JTH charge may be computed for each single name entity and the maximum is taken. The difference between the original VaR and the maximum JTH VaR may be the JTH risk requirement. The same distinction between margin and stress JTD may apply to JTH calculations, as well.

In some cases, the idiosyncratic risk factor calculator 1130 may use JTH and JTD risk requirements as add-on risk charges to cover for the default and/or drastic improvement in credit quality of an entity (e.g., a single name). Credit entities may be removed one at a time from the portfolio. Base spread requirements of the remaining portfolio is re-calculated. For JTD, index position scenario P&L's are reduced by a ratio of 1/(number of index constituents). For JTH, index position scenario P&L's are not adjusted. Each spread scenario P&L is added a JTD and JTH P&L for the removed entity. For JTD, (total single name notional with index decomposition)*(RR-current price). For JTH, (Single name notional)*(price at low percentile (0.5%) spread of high correlation scenarios–Current price). JTD and JTH quantiles are calculated from the new scenario P&L's for each entity k, using $VaR_P^{idio,k}$. The final JTD and JTH risk requirements are calculated as $\max_k\{VaR_P^{JTD,k}\}-VaR_P$ and $\max_k\{VaR_P^{JTH,k}\}-VaR_P$, respectively.

Interest Rate Risk Requirement

Figure 19:
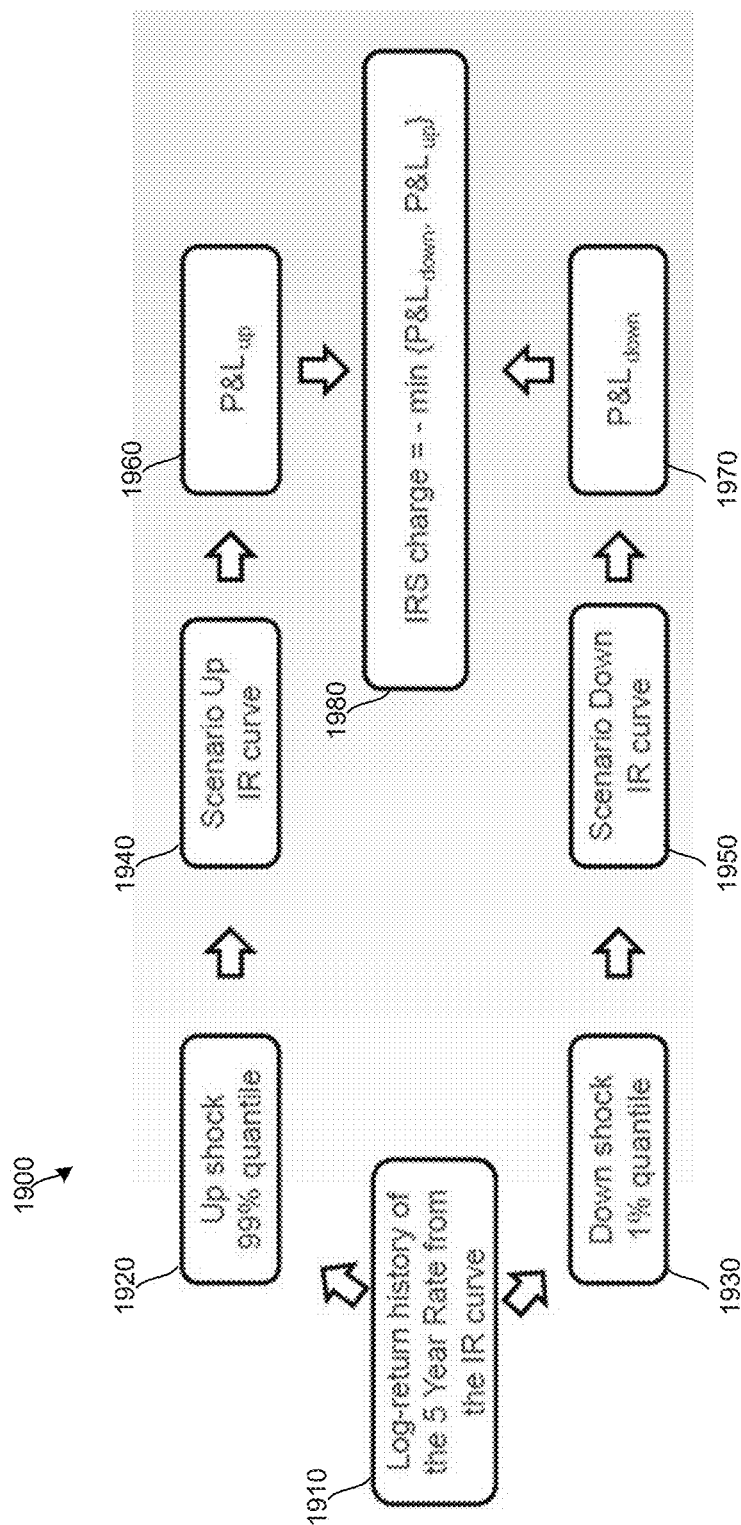
FIG. 19 shows an illustrative method for determining an interest rate sensitivity charge according to at least some embodiments.

FIG. 19 shows an illustrative method 1900 for determining an interest rate sensitivity charge according to at least some embodiments. An interest rate risk requirement, such as the interest rate sensitivity charge, may be intended to cover losses in credit portfolios due to extreme moves in interest rates. The charge may be computed as the maximum of the losses under parallel up and down shocks to the interest rate curve used for CDS pricing. The shock sizes may be calibrated to a reference pivot rate.

For example, the illustrative method may be processed as instructions by the interest rate risk factor calculator 1150 to calculate the interest rate sensitivity factor. In some cases, the interest rate sensitivity charge may be used to cover losses due to changes in interest rate term structures. The sensitivity is mainly due to the parallel upward and downward shifts of the interest rate (IR) curve. In an illustrative example, at 1910, a log-return history of the 5-year rate may be determined from the IR curve. Using the log-return history, an up shock (e.g., a 99% quantile, a 99.5% quantile, etc.) may be determined at 1920 and a down shock (e.g., a 1% quantile, a 0.5% quantile, etc.) may be determined at 1930. Using the up shock and the down shock, the interest rate sensitivity module may determine an "up-scenario" IR curve at 1940 and a "down-scenario" IR curve at 1950. From the up-scenario IR curve, the interest rate risk factor calculator 1150 may determine one or more P&L scenarios, such as the one or more P&L up scenarios at 1960 and the one or more P&L down scenarios at 1970. From these P&L up scenarios and the P&L down scenarios, the interest rate risk factor calculator 1150 may determine, at 1980, an interest rate sensitivity charge based on a minimum of the P&L up and P&L down scenarios using the equation: (IRS charge)=−min{$P\&L_{up}$, $P\&L_{down}$}.

Spread Risk Requirement

A Monte Carlo based scenario generation approach may be used to sample risk factor scenarios that are in line with the salient characteristics of the index and single name log spread changes.

Figure 17:
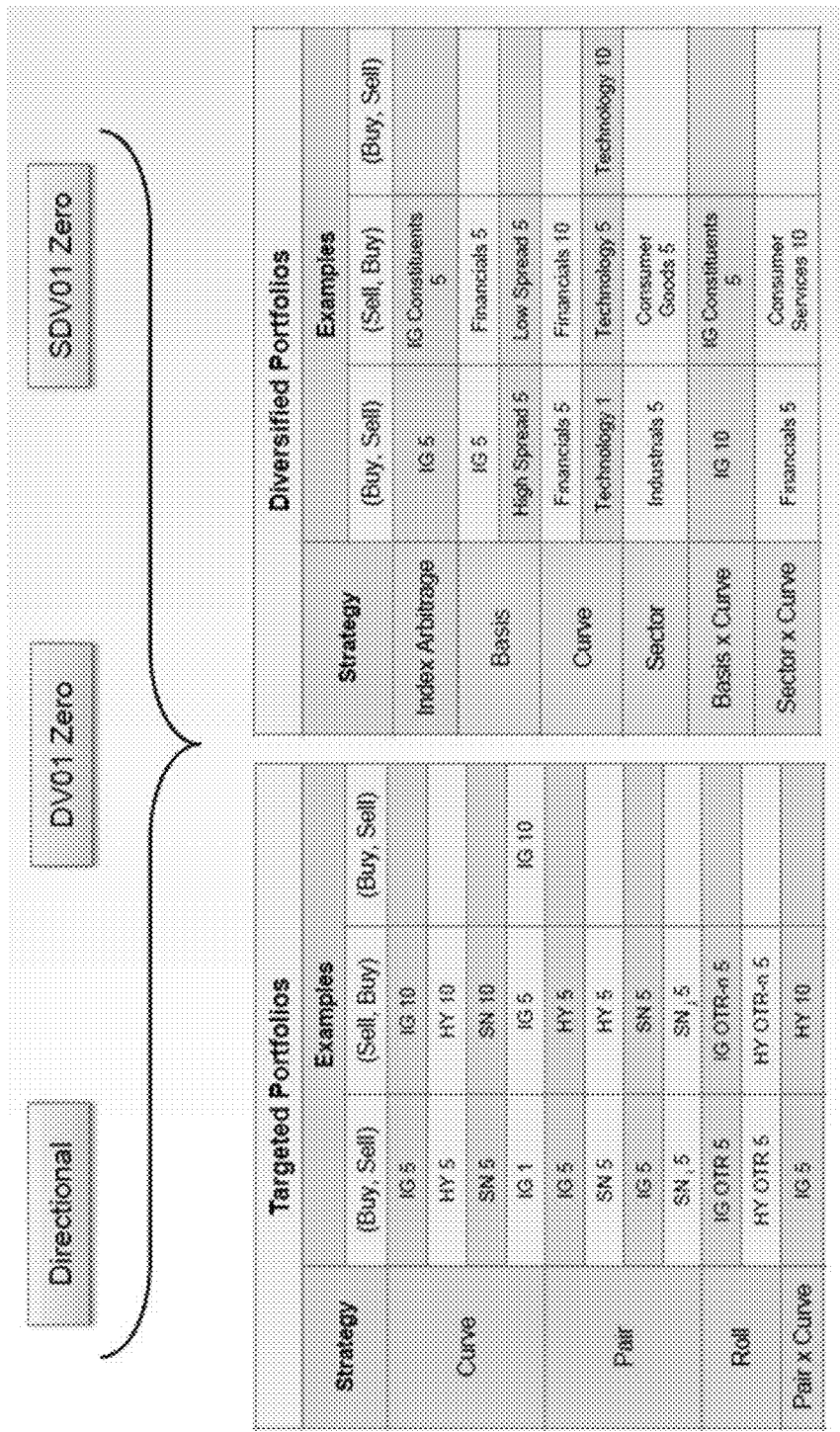
FIG. 17 shows an illustrative backtesting framework for testing a risk model for a CDS portfolio according to at least some embodiments.
Figure 23:
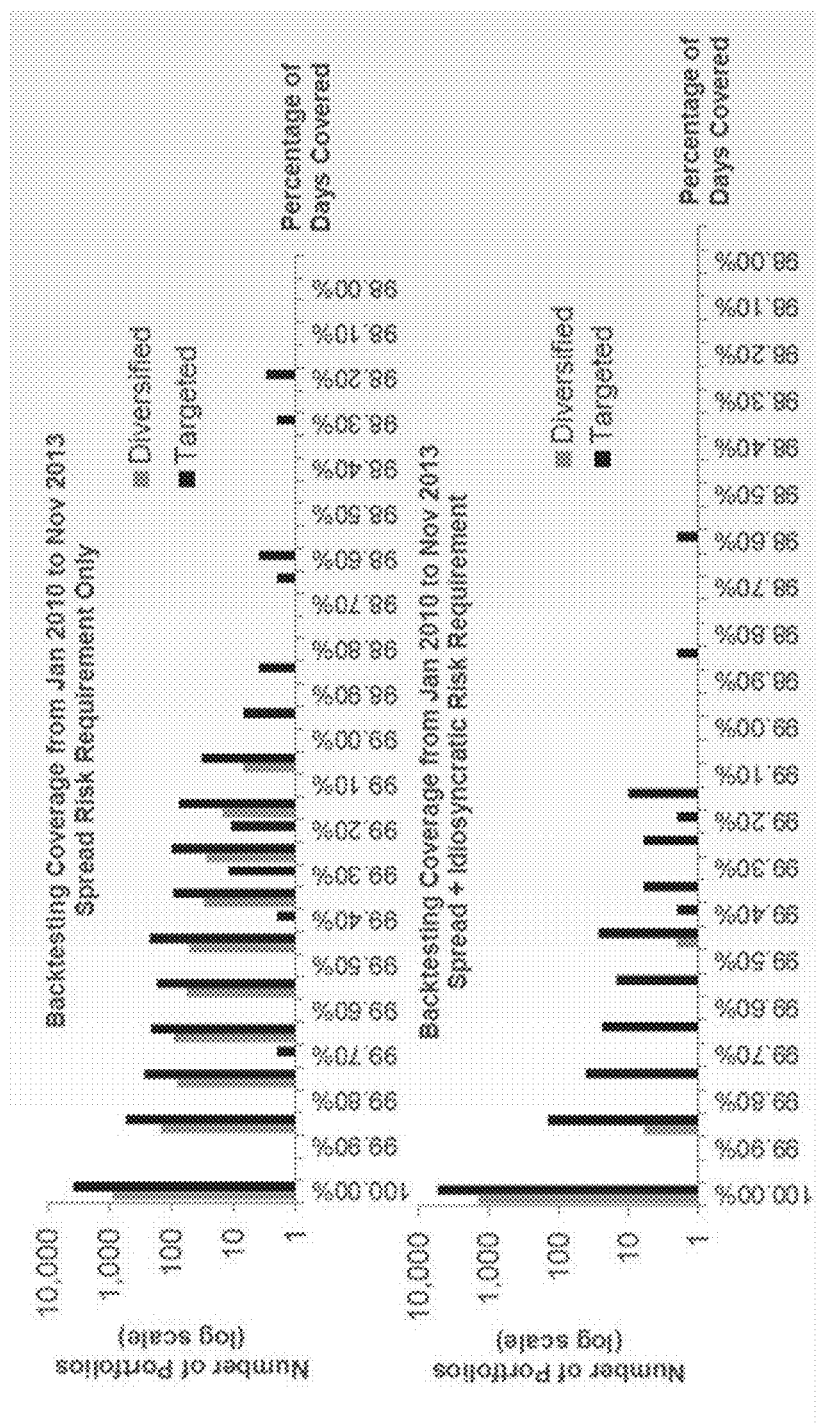
FIGS. 23-24 show illustrative backtesting results of historical portfolio information based on the risk model according to at least some embodiments.
Figure 24:
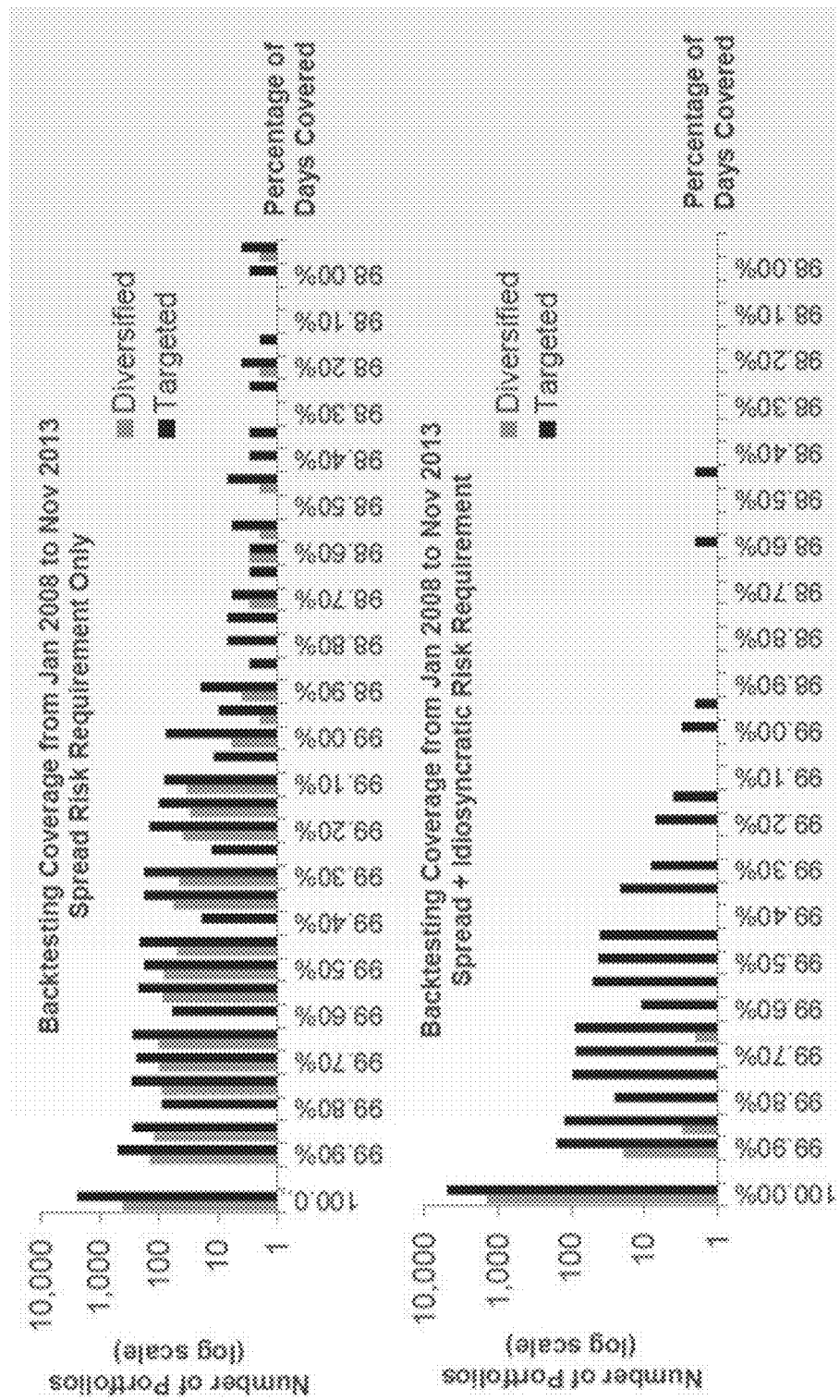

Given the risk factor scenarios under historical, low and high correlation scenario sets, the overall spread risk requirement may be calculated as a combination of value at risk (VaR) numbers under each of the correlation setups. For margin, the spread risk requirement may be the sum of the historical VaR and a fraction of the maximum of low correlation scenario set VaR (e.g., Basis VaR) and the high correlation scenario set VaR (e.g., Systematic VaR). The fraction may be calibrated to backtesting results for margin calculations and may be set to one for stress calculations. The stress VaR may be computed from a higher quantile of scenario P&L distribution compared to margin VaR. In an example, FIG. 17 shows an illustrative backtesting framework for testing a risk model for a CDS portfolio according to at least some embodiments. The backtesting framework may be used to test directional risk, and exposure based on DV01 and/or SDV01. In some cases, the models may be backtested using targeted portfolios 1700 and/or diversified portfolios 1750 that may include representations of different strategies include curve, pair, roll, pair×curve, index arbitrage, basis, sector, basis×sector, and sector×curve strategies. FIGS. 23-24 show illustrative backtesting results based on historical portfolio information using the risk modelling techniques according to at least some embodiments.

Figure 14:
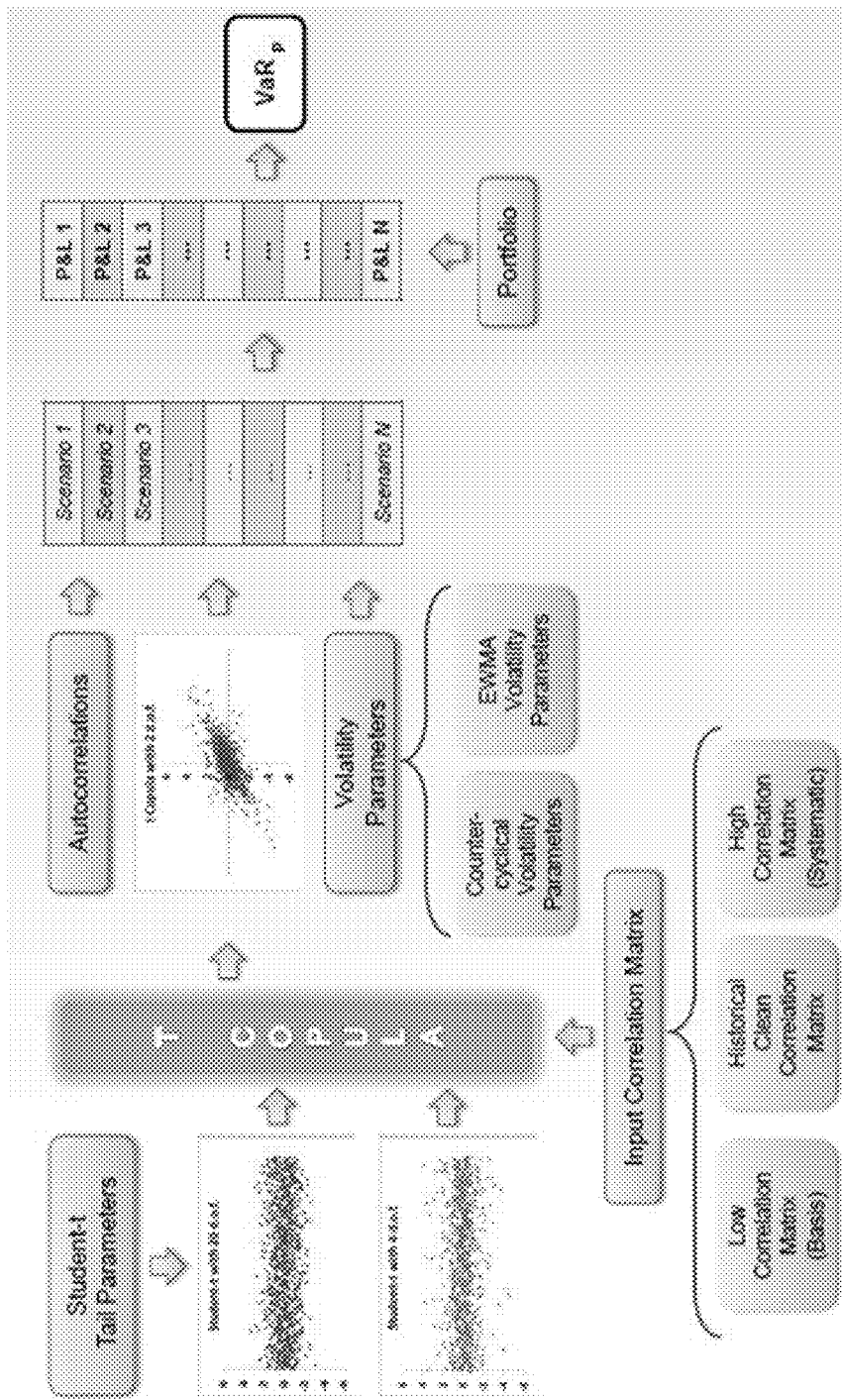
FIGS. 14 and 15 show an illustrative method for determining a total spread risk requirement for a risk model of a CDS portfolio according to at least some embodiments.
Figure 15:
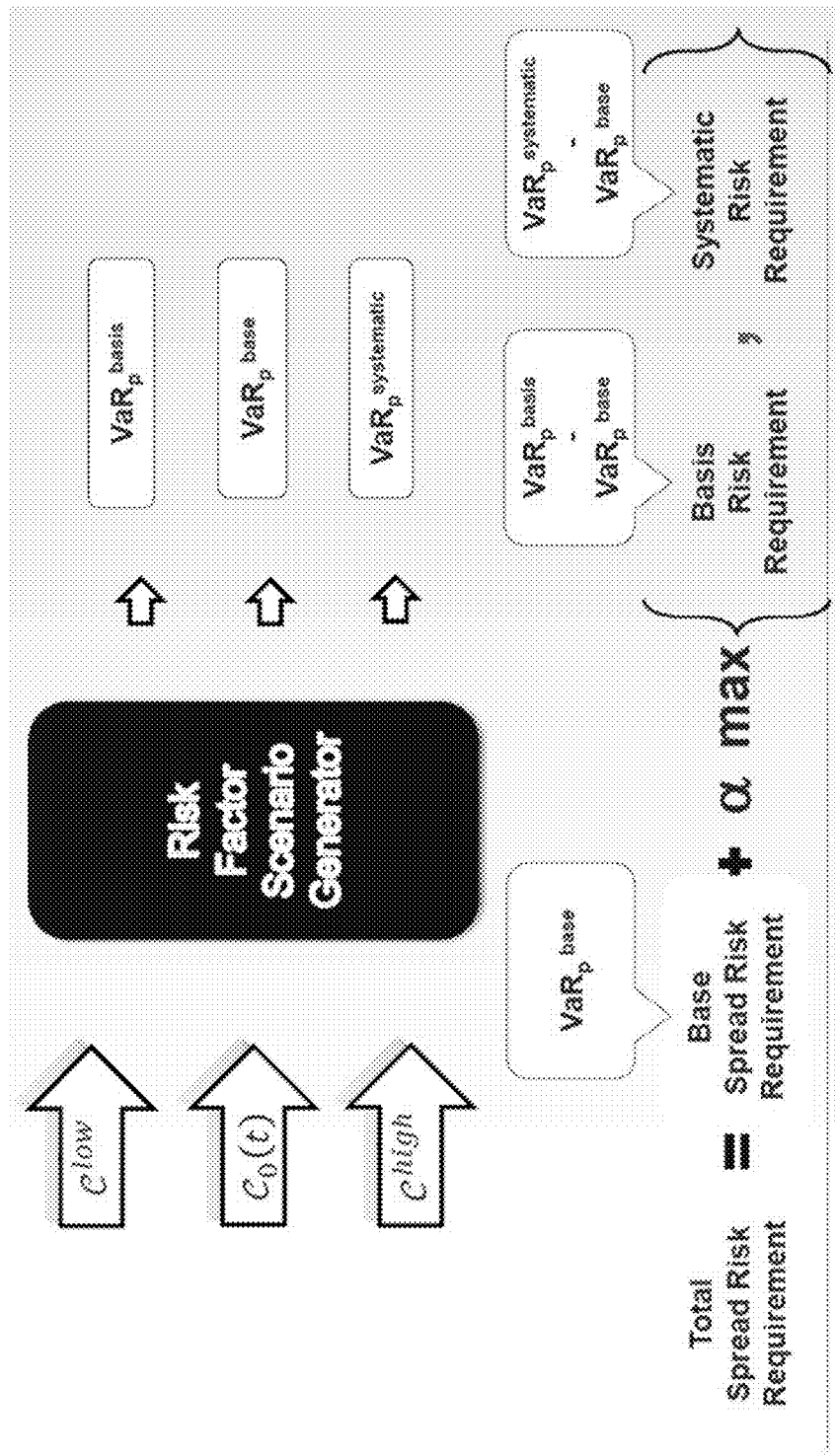

FIGS. 14 and 15 show an illustrative method for determining a total spread risk requirement for a risk model of a CDS portfolio according to at least some embodiments. For example, FIG. 14 shows an illustrative process that may use a Monte Carlo based approach to determine the total spread risk requirement for the CDS portfolio. For example, the Monte Carlo based scenario generation approach may be used to sample risk factor scenarios that are in line with the salient characteristics of the index and single name log spread changes. For example, the dependence across different risk factors may be modeled to show interdependence of variables, such as by using a copula. In an example, a symmetric copula (e.g., a student t-copula, a Gaussian copula, etc.) with multiple degrees of freedom may be used, such as a symmetric t-copula having 4 degrees of freedom may be used. Statistical tests may be performed on the empirical copula for pairs of risk factors to justify the choice of the multivariate copula distribution. Symmetric nature of the dependence structure may also be tested.

Three different correlation scenarios may be input to the risk factor scenario generator (e.g., a copula Monte Carlo scenario generator) to estimate a base, basis and systematic Value-at-Risk (VaR), including a historical correlation matrix, a high correlation matrix and a low correlation matrix. The historical correlation matrix may comprise a raw historical correlation matrix that may be a sample correlation matrix of empirical residual ranks This raw historical correlation matrix may be cleaned for removing spurious correlations and noise using one or more different methods, such as random matrix theory (RMT) and principal component analysis (PCA) methods. The high correlation matrix may be a counter cyclical correlation matrix that may imply perfect positive correlation among all risk factors which leads to Systematic VaR. The low correlation matrix may be a counter cyclical correlation matrix that may imply zero correlation among all risk factors, except for index to index pairs, which leads to Basis VaR The risk factor scenarios output from a t-copula as computed by the risk factor scenario generator may be scaled by their corresponding marginal t-distributions and the forecasted exponential weighted moving average (EWMA) volatilities. The scaling with EWMA volatilities may also take into account scaling from 1-day shocks to margin period-of-risk shocks (5-day). This may be done by taking into account the first order effect of autocorrelations.

The marginal distribution of each risk factor may be calibrated to its own time-series. This allows differentiating between the extents of heavy-tailed behavior across different risk factors. Each risk factor may be assumed to have a Student t-distribution. The degree of freedom may be determined by Anderson-Darling test. An empirical analysis on the symmetric nature of the residual distribution may be used to justify the choice of symmetric t-distribution. The fitted t-distribution may be used to transform empirical residuals to residual ranks.

The t-distribution for each risk factor may be fitted to the time-series of empirical residuals. Empirical residuals are simply de-autocorrelated and standardized log changes of risk factors. This standardization may be done using EWMA estimates of volatility.

For stress calculations, the volatility scalar may be taken as the maximum of a multiple of the EWMA forecast and the maximum of the historical EWMA forecasts. The multiplier for the current EWM forecast may be calibrated to the results of a cross sectional analysis of post/pre Lehman EWMA forecasts across different risk factors.

As shown in FIG. 15, given the risk factor scenarios under historical, low and high correlation scenario sets, the overall spread risk requirement may be calculated as a combination of VaR numbers under each of the correlation setups. For margin, the spread risk requirement may be the sum of the historical VaR and a fraction of the maximum of low correlation scenario set VaR (Basis VaR) and the high correlation scenario set VaR (Systematic VaR). The fraction may be calibrated to backtesting results for margin calculations and may be set to one for stress calculations. The stress VaR may be computed from a higher quantile of scenario profit and loss (P&L) distribution as compared to margin VaR. The total spread risk requirement may be calculated using the formula: total spread risk requirement (TSRR)

=Base spread risk requirement+α max {basis risk requirement, Systematic risk requirement}.

$$\text{TSRR} = (\text{VaR}_{pbase}) + \alpha \max\{(\text{VaR}_p\text{basis} - \text{VaR}_p\text{base}), (\text{VaR}_p\text{systematic} - \text{VaR}_p\text{base})\}$$

Stress Model

Figure 16:
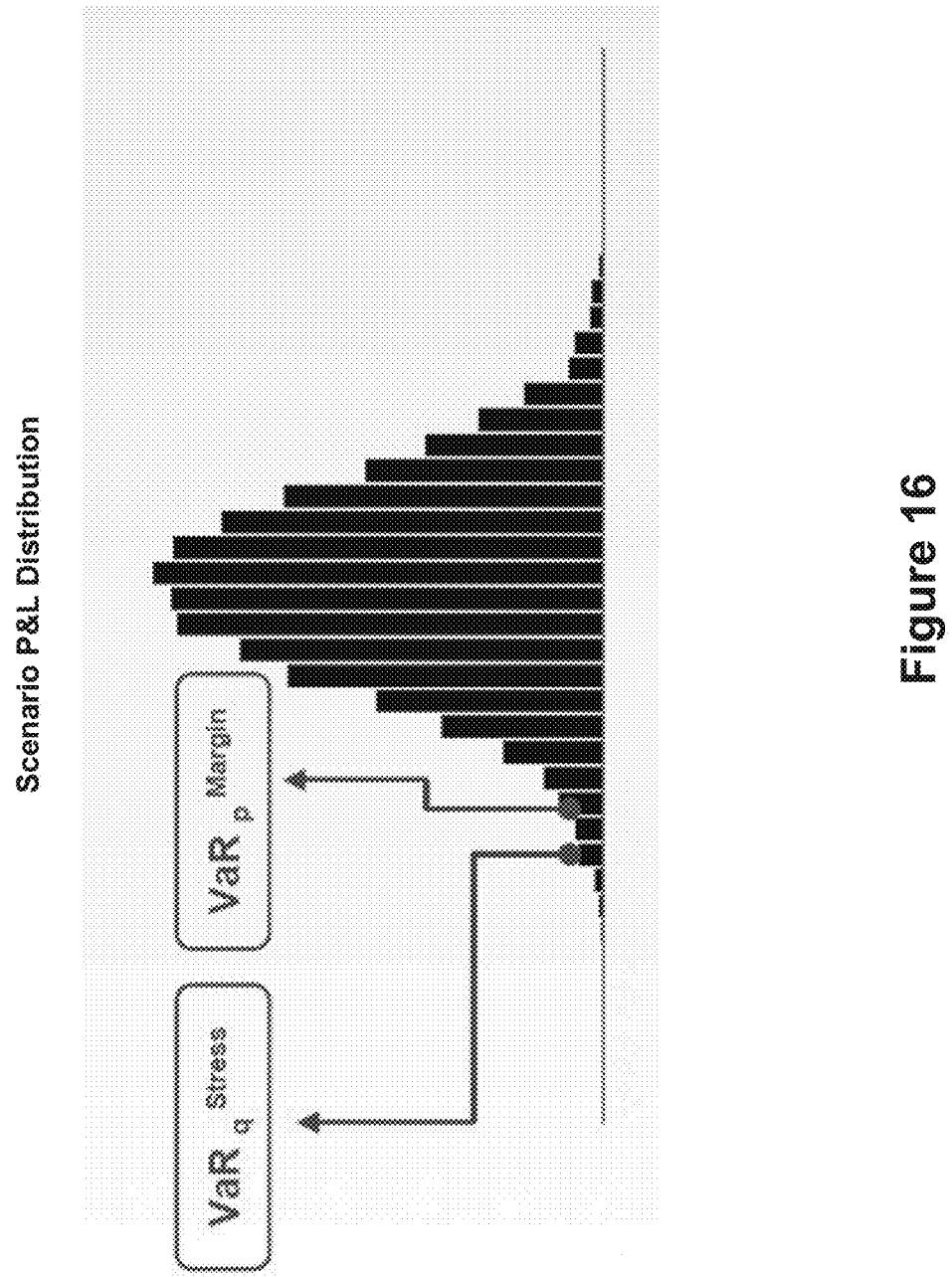
FIG. 16 shows an illustrative profit and loss distribution of a risk model according to at least some embodiments.

For determining a size of a guaranteed fund, a stress model may be used. In some cases, the stress model may be an extension of the margin model. As shown in FIG. 16, the stress spread risk requirement may be calculated from a higher quantile of the P&L distribution across scenarios, for example $\text{VaR}_q$ may represent the stress spread risk requirement (e.g., value at risk), where q=99.75%. The number of entities considered for JTD using the stress model may be limited to a preselected number, such as by selecting a constant number (e.g., 2). The JTH spread may be computed from a lower percentile of the high correlation scenarios (e.g., 0.05%), where the spread risk requirement may be the maximum of base, basis and systematic stress VaR (e.g., aStress=1). The stress volatility forecast may be chosen as the maximum of 99.75% of the historical EWMA volatility or 2.35 times the most recent EWMA volatility. The interest rate risk requirement may be computed from 0.25% and 99.75% percentiles of historical log changes of the 5 year point on the IR curve.

The stress model may be used for determining a size of a guarantee fund associated with a cleared credit portfolio. The stress model may be an extension of the margin model, where the stress spread risk requirement may be calculated from a higher percentile of the P&L distribution across scenarios (e.g., $\text{VaR}_q$, where q=99.75%). In the calculation, a number of entities may be considered for the jump-to-default. For example, two entities may be considered in the jump-to-default calculations. Similarly, the JTH spread may be computed from a lower (e.g., 0.05%) percentile of the high correlation scenarios. The spread risk requirement is the maximum of the base, basis and system stress VaR, where $\alpha_{stress}=1$. Further, the stress volatility forecast may be chosen to be the maximum of the (99.75% percentile of historical EWMA volatility) and (2.3 times the most recent EWMA volatility). In some cases, the interest rate risk requirement may be computed from the 0.25% and the 99.75% percentile of historical log changes of the 5-year point on the IR curve.

The stress model of the RMCC, as implemented using the clearinghouse computing system 240, may allow for a comprehensive set of scenarios. Parameter sets used with the stress model may be used to cover "extreme but plausible scenarios." For example, these scenarios may be used to address low probability, but high impact risk factors resulting from certain situations. By combining the margin model and the stress model in the RMCC, use of both the margin model and the stress model may be simple and intuitive and results may be easy to replicate by end users.

The risk model may be used to analyze and/or model statistical features of credit spread movements for one or both of single name CDS and CDS indices. For example, the RMCC may allow for time series analysis of different risk factors (e.g., spread log changes, etc.) associated with a particular CDS product and/or with a portfolio of CDS products. For single name CDS products, the risk factors may include par spreads at fixed benchmark tenors (e.g., 1 year, 3 year, 5 year, 7 year, 10 year, etc.). For CDS indices, the risk factors may include par spreads of synthetic on the run or off the run (OTR) indices (e.g., $\text{OTR}_{-k}$ (k=0,1, . . . ) at a fixed maturity) that may be interpolated at fixed benchmark tenors to preserve stationarity. For the RMCC, salient characteristics of risk factors may include autocorrelations that may be non-uniform across entities and tenors, heteroscedasticity, varying degrees of heavy tails that may be observed but have statistically weak asymmetry, stable average correlations (e.g., Single name —Single name, Single name —Index, Index —Index, and the like). In some cases, the characteristics may have strong correlations across tenors, strong dependence across on-the-run and off-the-run indices of the same index family, an index on a constituent basis, a breakdown of correlations in distressed markets and or jumps which may be defaults (jump-to-default) and/or drastic improvements (e.g., a jump to health) in credit quality.

In some cases, the RMCC may be modeled using a risk modeling computing system that may be associated with a financial institution and/or a clearinghouse. The risk modeling computing system may be configured to store models in a data repository and/or another non-transitory memory device as instructions and/or other information (e.g., parameters, CDS market information, CDS index information, CDS single name information, and/or the like. For example, the risk modeling computing system may include one or more computing devices configured to retrieve the instructions and/or other information from the data repository and/or non-transitory memory device via a network to generate a risk model for use as the RMCC by a risk model generator. In some cases, the risk model generator may design the RMCC using one or more different model types, such as a factor model or a scenario based model. Each model has associated advantages and disadvantages. For example, factor models may be simple and easy to calibrate, but may provide incoherent modeling of portfolio benefits. For example, the factor model may include rule based correlation offsets. However, these offsets may not be readily extendible to new risk factors which may be introduced to the model over time. Factor based models also may rely on a decomposition model for efficiency, for both basis and curve decomposition, but may be prone to double counting of risk associated with the portfolio.

Scenario based models may be considered to be comprehensive models due to explicit correlation modeling performed as part of the scenario based model. As such, scenario based models may be more easily extended to new risk factors. Due to availability of historical data, the scenario based models (e.g., a historical model, a Monte Carlo model, etc.) may need to be implemented parsimoniously. Further, scenario based models may be more complex than other model types and, as such, may be more difficult to calibrate. However, scenario-based models may offer greater stability of modeling parameters through the use of correlations and distributions.

Results

Figure 20:
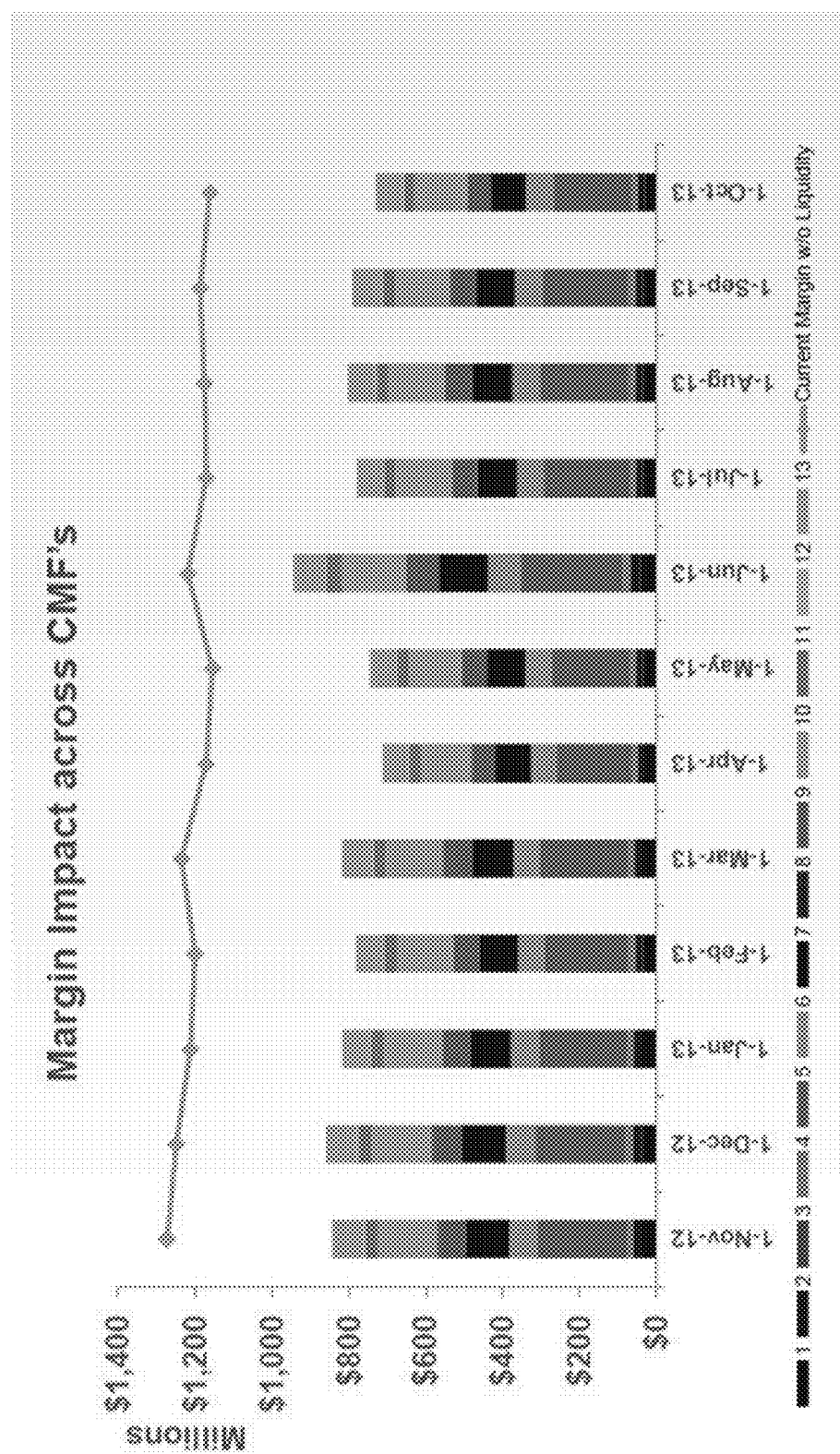
FIGS. 20-22 show charts illustrative of a margin impact based on the risk model for a CDS portfolio according to at least some embodiments.
Figure 21:
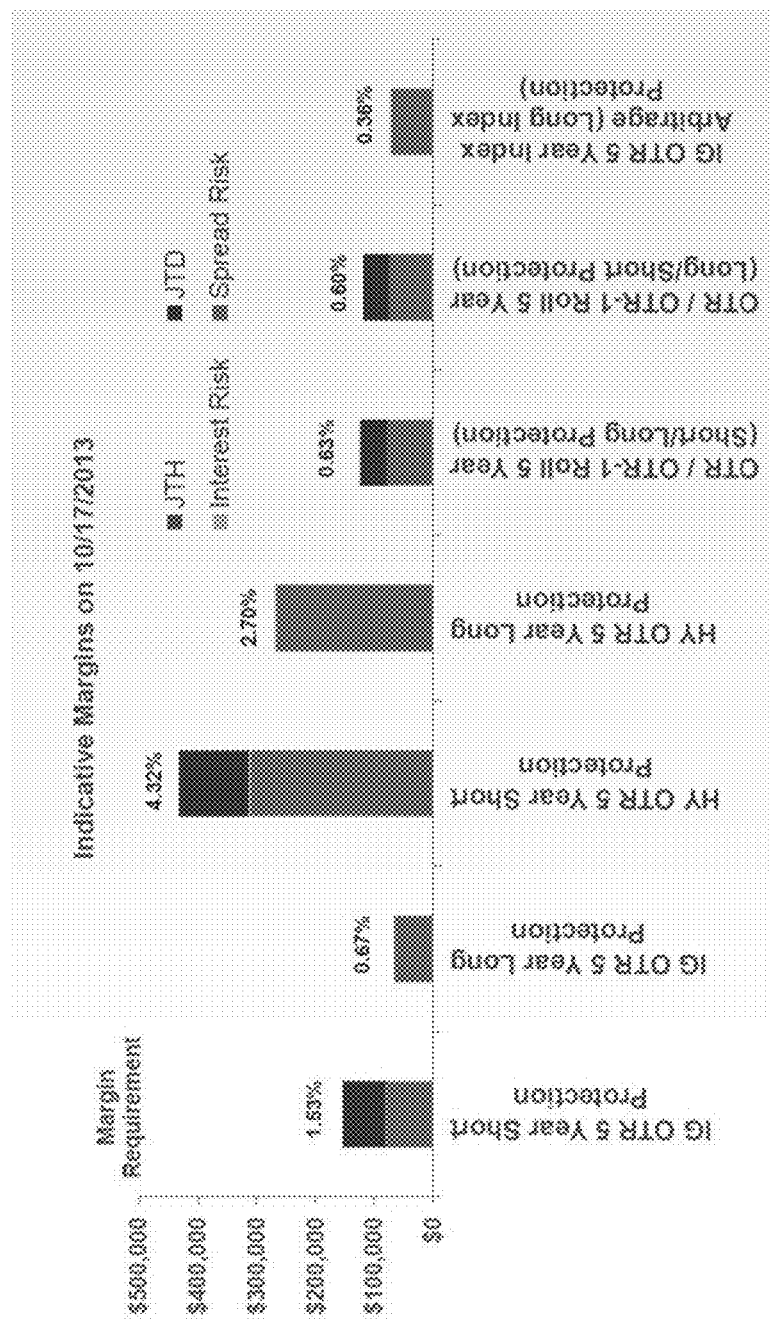
Figure 22:
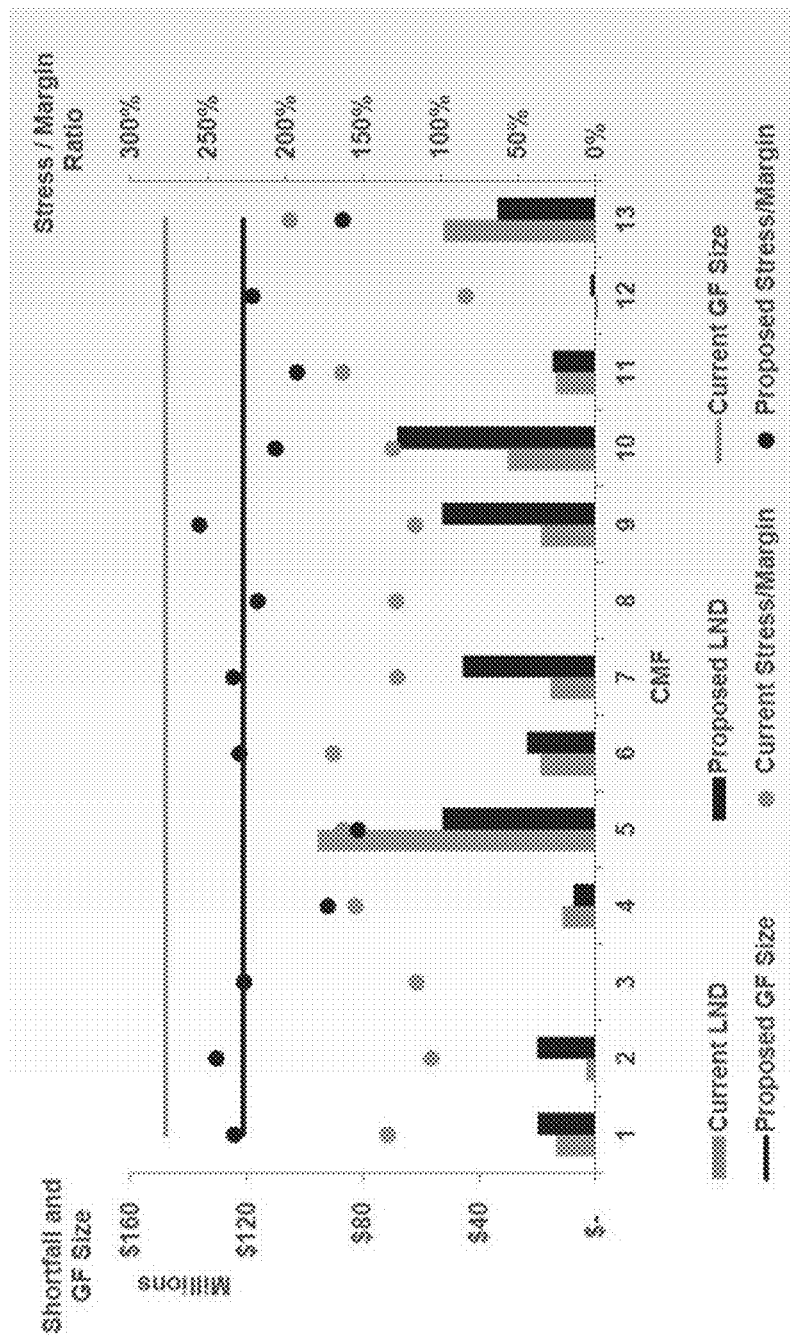
Figure 25:
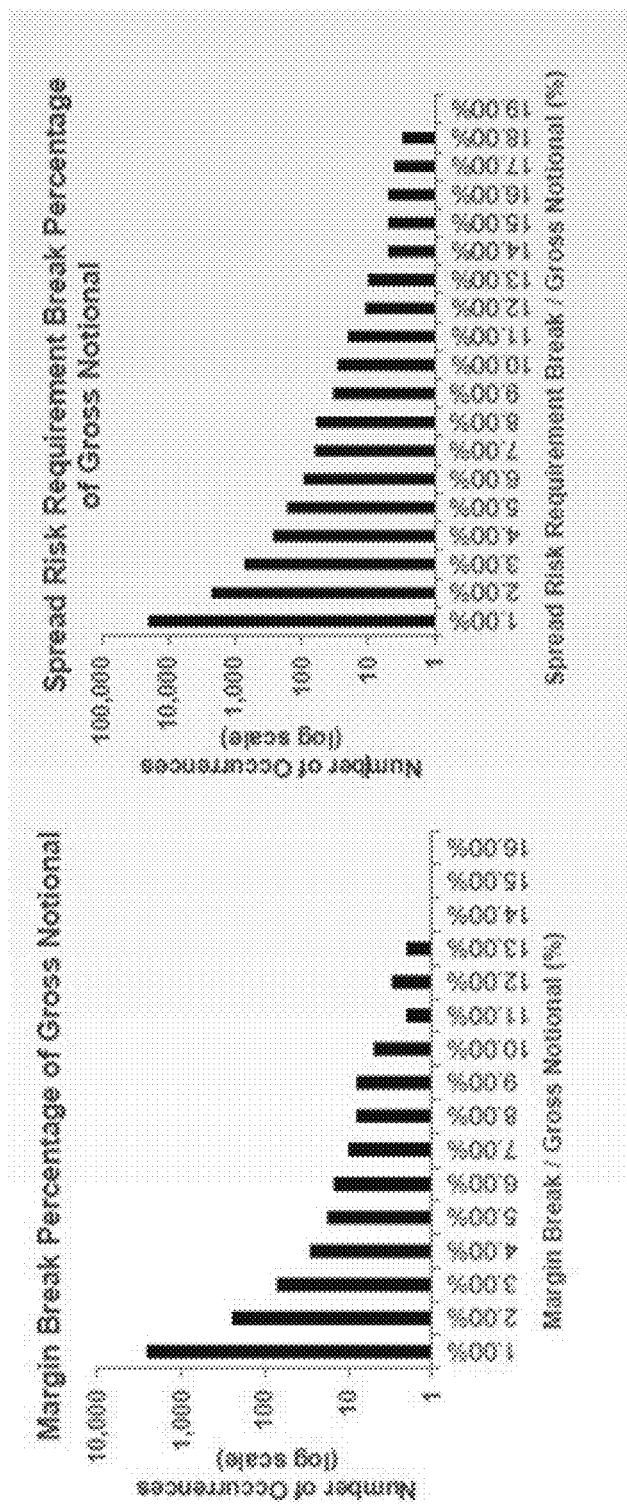
FIG. 25 shows an illustrative margin break percentage of gross notional and an illustrative spread risk requirement break percentage of gross notional per a number of occurrences based on the risk model according to at least some embodiments.

FIGS. 20-22 show charts illustrative of a margin impact based on the risk model for a CDS portfolio according to at least some embodiments and FIGS. 23-24 show illustrative backtesting results of historical portfolio information based on the risk model according to at least some embodiments. FIG. 20 illustrates the resulting impact on margin accounts across clearing member firms associated with the clearing house. As can be seen, the margin requirements may be recalculated on a periodic or intermittent basis. In the example of FIG. 20 the clearinghouse calculates margin requirements for cleared credit portfolios on a monthly basis (at the first of the month). Using historical data between November 2012 and October 2013, the margin requirements associated with cleared credit portfolios associated with clearinghouse members were recalculated and totaled across the clearing member firms for each month. Each monthly total was then compared to the previously calculated margin account totals determined using a previous model. In the illustrated example, the previously used model did not consider liquidity of the accounts in the margin determination. As can be seen. the margin requirements can be reduced, in some cases significantly, by using the model discussed above. FIG. 24 illustrates a margin determination associated with particular CDS portfolio types, such as those using specified strategies. Here, the margin requirements have been broken down so that the margin requirement associated with a jump-to-default factor, a jump-to-health factor, an interest rate risk factor, and a spread risk factor can be observed. As can be seen, of these listed factors, the spread risk factor has a greater impact than the other risk factors combined, excluding liquidity. FIG. 22 shows another comparison between margin account/guarantee fund sizing across clearing member firms, where the margin account/guarantee fund sizes may be determined using previously existent models and a model corresponding to the embodiments discussed herein. As can be seen, across the different clearing member firms, the proposed size of the guarantee funds can be reduced by approximately 20% (e.g., from about $150 million to about $120 million). Further, in most cases, a proposed stress to margin ratio can be reduced across most clearing member firms based on use of the models discussed herein. FIG. 23 shows illustrative forward backtesting results performed on approximately 7000 portfolios using historical data from between January 2010 and November 2013. In this case, the portfolios included both targeted and diversified portfolios. FIG. 24 shows illustrative backtesting results for the same portfolios, where the backtesting results included reverse backtesting using historical information from January 2010 to January 2008, and forward backtesting using historical information from between January 2010 and November 2013. FIG. 25 shows illustrative charts displaying a margin break percentage of gross notional per a number of occurrences and a spread risk requirement break percentage of gross notional per a number of occurrences.

The present invention has been described in terms of preferred and exemplary embodiments thereof. Numerous other embodiments, modifications and variations within the scope and spirit of the invention will occur to persons of ordinary skill in the art from a review of this disclosure. For example, aspects of the invention may be used to process and communicate data other than market data.

We claim:

1. A credit default swap (CDS) risk modeling computing system comprising:
 a data repository storing a risk model for cleared credit (RMCC), the RMCC being reactive to current market conditions and persistent to extreme events and including both a margin model and a stress model, the stress model being an extension of the margin model;
 at least one processor; and
 one or more non-transitory memory devices communicatively coupled to the at least one processor, the non-transitory memory devices storing instructions that, when executed by the at least one processor, cause the CDS risk modeling computing system to:
  retrieve, the RMCC from the data repository;
  process, the RMCC based on a statistical analysis of risk factors underlying components of a portfolio;
  receive, from a user interface screen via a network, an input identifying whether a stress evaluation is to be performed using the stress model or a margin calculation is to be performed using the margin model;
  calculate, using a spread risk factor calculator, a spread risk factor based on the input and an identification of whether the stress evaluation is being performed or the margin calculation is being performed, the spread risk factor corresponding to a value at risk (VaR) associated with a plurality of correlation scenario sets, wherein the correlation scenario sets correspond to characteristics of at least one of a single name credit default swap or an index credit default swap of the portfolio;
  calculate, using an idiosyncratic risk factor calculator, an idiosyncratic risk factor corresponding to a jump-to-default (JTD) charge and a jump-to-health (JTH) charge associated with the portfolio;
  calculate, using an interest rate risk factor calculator, an interest rate risk factor corresponding to losses associated with the portfolio due to a change in interest rates, wherein the interest rate risk factor corresponds to at least an upshot loss and a down shock loss;
  calculate, using a liquidity risk factor calculator, a liquidity risk factor corresponding to a liquidity charge associated with the portfolio;
  when the input indicates the margin calculation is being performed, calculate, by a margin calculator, a margin requirement for the portfolio based, at least in part on the spread risk factor, the idiosyncratic risk factor, the interest rate risk factor, and the liquidity risk factor; or
  when the input indicates the stress evaluation is being performed, calculate a stress requirement associated with the portfolio based, at least in part on the spread risk factor, the idiosyncratic risk factor, the interest rate risk factor, and the liquidity risk factor; and
  present information corresponding to the calculated stress requirement or the calculated margin requirement.

2. The CDS risk modeling computing system of claim 1, wherein the one or more non-transitory memory devices further store instructions that, when executed by the at least one processor, cause the spread risk factor calculator to:
 model, using a Monte Carlo-based scenario generator, a plurality of risk factors using a symmetric t-copula with four degrees of freedom, wherein an empirical copula associated with risk factor pairs is used to justify a choice of a multivariate copula distribution.

3. The CDS risk modeling computing system of claim 2, wherein the one or more non-transitory memory devices further store instructions that, when executed by the at least one processor, cause the scenario generator to
 receive, at an input to the scenario generator, one or more correlation scenarios comprising a historical correlation matrix, a systemic correlation matrix, and a basis correlation matrix; and
 estimate one or more of a base value-at-risk (VaR), a basis VaR, and a systematic VaR based on the one or more correlation scenarios.

4. The CDS risk modeling computing system of claim 3, wherein the one or more non-transitory memory devices further store instructions that, when executed by the at least one processor, cause the scenario generator to
 calculate a margin spread risk factor as a sum of the base VaR and a fraction of a maximum of either the basis VaR and the systematic VaR.

5. The CDS risk modeling computing system of claim 3, wherein the one or more non-transitory memory devices further store instructions that, when executed by the at least one processor, cause the scenario generator to
calculate a stress spread risk factor as a sum of the base VaR and a fraction of a maximum of either the basis VaR and the systematic VaR, wherein a first quantile of profit and loss (P&L) distributions associated with a stress spread risk factor is greater than a second quantile of P&L distributions associated with a margin spread risk factor.

6. The CDS risk modeling computing system of claim 2, wherein the one or more non-transitory memory devices further store instructions that, when executed by the at least one processor, cause the scenario generator to:
scale outputs from the symmetric t-copula by a corresponding marginal t-distribution and a forecasted exponential weighted moving average (EWMA) volatility.

7. The CDS risk modeling computing system of claim 6, wherein the one or more non-transitory memory devices further store instructions that, when executed by the at least one processor, cause the scenario generator to scale an EWMA volatility using a 1-day shock value and a margin period-of-risk shock value.

8. The CDS risk modeling computing system of claim 7, wherein a multiplier for a EWMA forecast is calibrated to a result of a cross sectional analysis of post or pre Lehman EWMA forecasts across different risk factors.

9. The CDS risk modeling computing system of claim 1, wherein the one or more non-transitory memory devices further store instructions that, when executed by the at least one processor, cause the idiosyncratic risk factor calculator to:
calculate an overall portfolio VaR associated with the portfolio;
calculate a JTD value-at-risk (VaR) associated with each single name position associated with the portfolio, wherein each JTD VaR comprises a default charge associated with a particular single name position and a remaining portfolio VaR corresponding to a remaining portion of the portfolio after removing the particular single name position;
calculate a maximum JTD VaR of the JTD VaR associated with each single name position; and
calculate the JTD charge as a difference between the maximum JTD VaR and the overall portfolio VaR.

10. The CDS risk modeling computing system of claim 9, wherein the one or more non-transitory memory devices further store instructions that, when executed by the at least one processor, cause the idiosyncratic risk factor calculator to:
calculate the remaining portfolio VaR associated with the portfolio after removing the particular single name position, wherein each index position in the remaining portion of the portfolio is adjusted to account for the removal of the particular single name position; and
calculate the default charge associated with the particular single name position as a difference between a current price of the particular single name position and a minimum recovery rate observed through a history associated with the particular single name position.

11. The CDS risk modeling computing system of claim 9, wherein, the one or more non-transitory memory devices further store instructions that, when executed by the at least one processor, cause the idiosyncratic risk factor calculator to:
calculate a margin JTD charge associated with the portfolio based on a historical correlation scenario set, wherein the margin JTD charge is used in calculating a margin requirement associated with the portfolio.

12. The CDS risk modeling computing system of claim 9, wherein, the one or more non-transitory memory devices further store instructions that, when executed by the at least one processor, cause the idiosyncratic risk factor calculator to:
calculate a historical JTD charge using a historical correlation scenario set;
calculate a basis JTD charge using a basis correlation scenario set;
calculate a systematic JTD charge using a systematic correlation scenario set; and
calculate a stress JTD charge associated with the portfolio as a maximum of the historical JTD charge, the basis JTD charge and the systematic JTD charge, wherein the stress JTD charge is used in determining a stress requirement associated with the portfolio.

13. The CDS risk modeling computing system of claim 1, wherein the one or more non-transitory memory devices further store instructions that, when executed by the at least one processor, cause the idiosyncratic risk factor calculator to:
calculate an overall portfolio VaR associated with the portfolio;
calculate a JTH value-at-risk (VaR) associated with each single name position associated with the portfolio, wherein each JTH VaR comprises a default charge associated with a particular single name position and a remaining portfolio VaR corresponding to a remaining portion of the portfolio after removing the particular single name position;
calculate a maximum JTH VaR of the JTH VaR associated with each single name position; and
calculate the JTH charge as a difference between the maximum JTH VaR and the overall portfolio VaR.

14. The CDS risk modeling computing system of claim 13, wherein, the one or more non-transitory memory devices further store instructions that, when executed by the at least one processor, cause the idiosyncratic risk factor calculator to:
calculate a margin JTH charge associated with the portfolio based on a historical correlation scenario set, wherein the margin JTH charge is used in calculating a margin requirement associated with the portfolio; and
calculate a stress JTH charge associated with the portfolio as a maximum of a historical JTD charge calculated using a historical correlation data set, a basis JTD charge calculated using a basis correlation data set and a systematic JTD charge calculated with a systematic correlation data set, wherein the stress JTD charge is used in determining a stress requirement associated with the portfolio.

15. The CDS risk modeling computing system of claim 1, wherein the one or more non-transitory memory devices further store instructions that, when executed by the at least one processor, cause the interest rate risk factor calculator to:
calculate an up-shock loss associated with an up shock to an interest rate curve used in CDS pricing;
calculate a down-shock loss associated with a down shock to the interest rate curve used in CDS pricing; and
calculate the interest rate risk factor as a maximum of the up-shock loss and the down-shock loss.

16. The CDS risk modeling computing system of claim 15, wherein a size of the up-shock and a size of the down shock are calibrated to a reference pivot rate.

17. The CDS risk modeling computing system of claim 1, wherein the one or more non-transitory memory devices further store instructions that, when executed by the at least one processor, cause the liquidity risk factor calculator to:
- calculate an outright exposure to an investment grade (IG) sub-portfolio of the portfolio;
- calculate an outright exposure to a high yield (HY) sub-portfolio of the portfolio;
- calculate a basis exposure to at least one of an index-based CDS sub-portfolio and a basis exposure to a single name CDS sub-portfolio of the portfolio; and
- calculate the liquidity risk factor based on the outright exposure of the IG sub-portfolio, the outright exposure of the HY sub-portfolio and the basis exposure of the CDS portfolio.

\* \* \* \* \*

UNITED STATES PATENT AND TRADEMARK OFFICE
CERTIFICATE OF CORRECTION

PATENT NO. : 10,430,880 B2
APPLICATION NO. : 14/706673
DATED : October 1, 2019
INVENTOR(S) : Evren Baysal et al.

Page 1 of 1

It is certified that error appears in the above-identified patent and that said Letters Patent is hereby corrected as shown below:

On the Title Page

Column 2, under Attorney, Agent or Firm, please change "Lempi" to "Lempia"

Signed and Sealed this
Seventeenth Day of December, 2019

Andrei Iancu
*Director of the United States Patent and Trademark Office*